(12) United States Patent
Mihara et al.

(10) Patent No.: US 9,113,161 B2
(45) Date of Patent: Aug. 18, 2015

(54) VIDEO DISPLAY APPARATUS, VIDEO VIEWING GLASSES, AND SYSTEM COMPRISING THE DISPLAY APPARATUS AND THE GLASSES

(75) Inventors: Kazuhiro Mihara, Osaka (JP); Shuji Inoue, Osaka (JP); Hiroshi Mitani, Osaka (JP); Masanobu Inoe, Osaka (JP); Keizo Matsumoto, Osaka (JP); Kazuo Okamoto, Osaka (JP); Katsuo Saigo, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 274 days.

(21) Appl. No.: 13/264,466

(22) PCT Filed: Jul. 14, 2009

(86) PCT No.: PCT/JP2009/003306
§ 371 (c)(1),
(2), (4) Date: Oct. 14, 2011

(87) PCT Pub. No.: WO2010/119490
PCT Pub. Date: Oct. 21, 2010

(65) Prior Publication Data
US 2012/0033059 A1      Feb. 9, 2012

(30) Foreign Application Priority Data

Apr. 14, 2009   (JP) .................................. 2009-097887

(51) Int. Cl.
*H04N 13/04*   (2006.01)
*G09G 3/00*    (2006.01)
*G09G 3/28*    (2013.01)

(52) U.S. Cl.
CPC ........... *H04N 13/0497* (2013.01); *G09G 3/003* (2013.01); *G09G 3/28* (2013.01); *H04N 13/0438* (2013.01); *G09G 2310/065* (2013.01); *G09G 2320/0257* (2013.01); *H04N 2213/008* (2013.01)

(58) Field of Classification Search
USPC ....................................... 348/42–61; 382/154
See application file for complete search history.

(56) References Cited

U.S. PATENT DOCUMENTS 6,456,432 B1 * 9/2002 Lazzaro et al. ............... 359/464
6,532,592 B1   3/2003 Shintani et al.
(Continued)

FOREIGN PATENT DOCUMENTS

JP   62-43621    2/1987
JP   62-61493    3/1987
(Continued)

OTHER PUBLICATIONS
International Search Report issued Oct. 27, 2009 in International (PCT) Application No. PCT/JP2009/003306.
(Continued)

*Primary Examiner* — Frederick Bailey
(74) *Attorney, Agent, or Firm* — Wenderoth, Lind & Ponack, L.L.P.

(57) ABSTRACT

Provided is a video system equipped with a video display apparatus and video viewing glasses used for viewing a video displayed on the video display apparatus. The video display apparatus includes: a display section for displaying the video; a synchronizing signal generator for generating an external synchronizing signal in synchronism with the video to notify a display end of a frame constituting the video in synchronism with the video; and a synchronizing signal transmitter for transmitting the external synchronizing signal to the video viewing glasses. The video viewing glasses include: a synchronizing signal receiver for receiving the external synchronizing signal; an optical filter section having a pair of optical filters for adjusting light amounts to be transmitted to left and right eyes of a viewer, respectively; and an optical filter controller for controlling the optical filter section in response to the external synchronizing signal.

2 Claims, 22 Drawing Sheets

(56) References Cited

U.S. PATENT DOCUMENTS

| | | | |
|---|---|---|---|
| 6,687,399 B1 | 2/2004 | Chuang et al. | |
| 6,791,599 B1 | 9/2004 | Okada et al. | |
| 6,801,242 B1 | 10/2004 | Dwyer | |
| 2001/0043266 A1* | 11/2001 | Robinson et al. | 348/53 |
| 2003/0093813 A1 | 5/2003 | Shintani et al. | |
| 2008/0036696 A1 | 2/2008 | Slavenburg et al. | |
| 2009/0167845 A1* | 7/2009 | Khan | 348/51 |
| 2009/0237327 A1* | 9/2009 | Park et al. | 345/8 |
| 2010/0043027 A1 | 2/2010 | Shintani et al. | |
| 2010/0066661 A1 | 3/2010 | Kawahara | |
| 2010/0066820 A1 | 3/2010 | Park et al. | |
| 2011/0051018 A1 | 3/2011 | Shintani et al. | |

FOREIGN PATENT DOCUMENTS

| | | |
|---|---|---|
| JP | 62-276989 | 12/1987 |
| JP | 5-49072 | 2/1993 |
| JP | 6-105374 | 4/1994 |
| JP | 8-317423 | 11/1996 |
| JP | 8-327970 | 12/1996 |
| JP | 9-138384 | 5/1997 |
| JP | 10-243420 | 9/1998 |
| JP | 11-98538 | 4/1999 |
| JP | 11-127457 | 5/1999 |
| JP | 11-331879 | 11/1999 |
| JP | 2000-4451 | 1/2000 |
| JP | 2000-36969 | 2/2000 |
| JP | 2000-201344 | 7/2000 |
| JP | 2000-284224 | 10/2000 |
| JP | 2001-75045 | 3/2001 |
| JP | 2001-326948 | 11/2001 |
| JP | 2005-227424 | 8/2005 |
| JP | 2006-276101 | 10/2006 |
| JP | 2007-110683 | 4/2007 |
| JP | 2008-72699 | 3/2008 |
| JP | 2009-25436 | 2/2009 |
| JP | 2009-31523 | 2/2009 |
| JP | 2009-31524 | 2/2009 |
| WO | 2007/024313 | 3/2007 |
| WO | 2007/126904 | 11/2007 |

OTHER PUBLICATIONS

Japanese Office Action issued Nov. 30, 2010 in Japanese Application No. 2010-097244.
Japanese Office Action issued Nov. 30, 2010 in Japanese Application No. 2010-097245.
Japanese Office Action issued Nov. 30, 2010 in Japanese Application No. 2010-097246.
Japanese Office Action issued Nov. 30, 2010 in Japanese Application No. 2010-097247.
Japanese Office Action issued Nov. 30, 2010 in Japanese Application No. 2010-097248.
Japanese Office Action issued Nov. 30, 2010 in Japanese Application No. 2010-197744.
Japanese Office Action issued Feb. 23, 2010 in Application No. 2009-539567.
U.S. Office Action issued May 15, 2012 in corresponding U.S. Appl. No. 12/503,369.
Office Action issued Nov. 2, 2012 in related U.S. Appl. No. 12/503,369.
Extended European Search Report issued Dec. 11, 2012 in European Application No. 09843272.7.

* cited by examiner

FIG. 6
LEFT-EYE FRAME
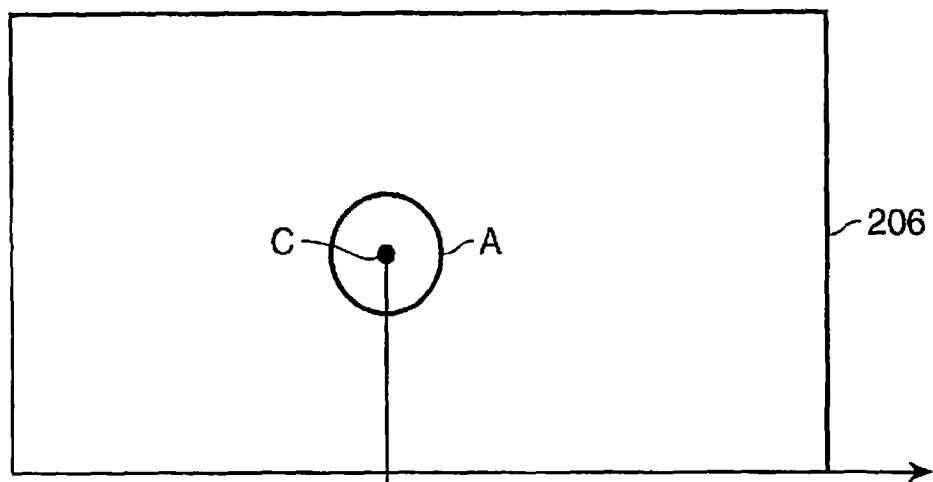
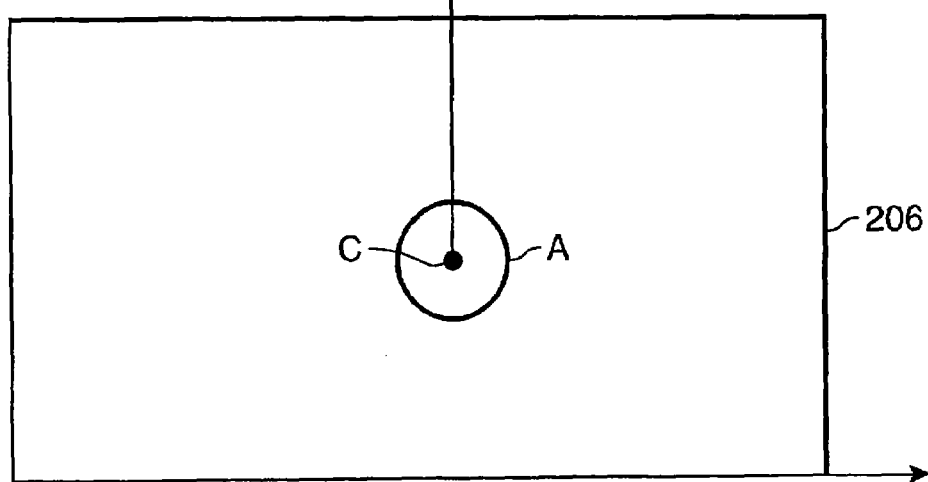
RIGHT-EYE FRAME

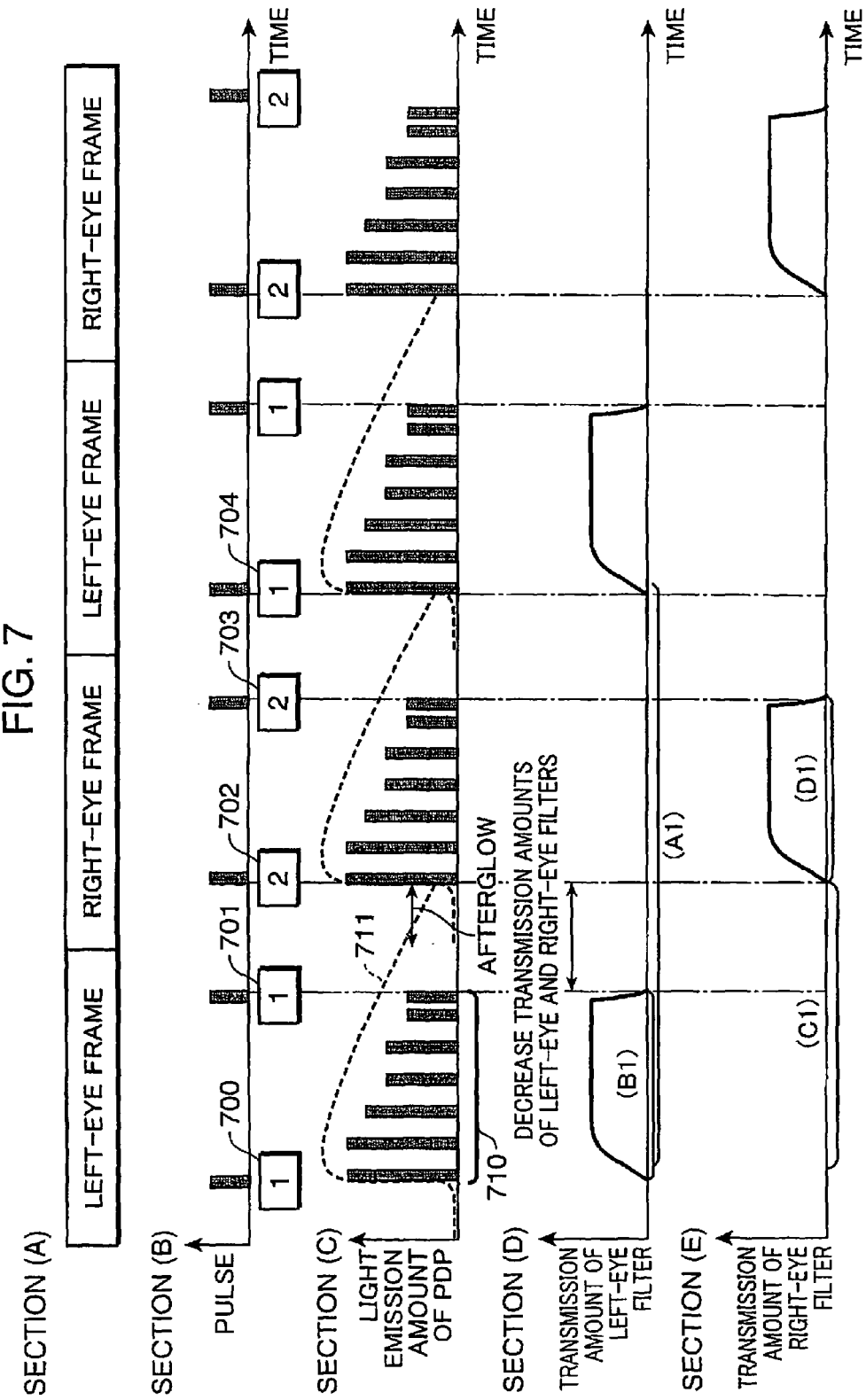

FIG. 21
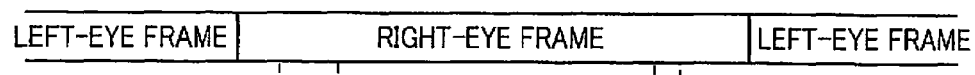
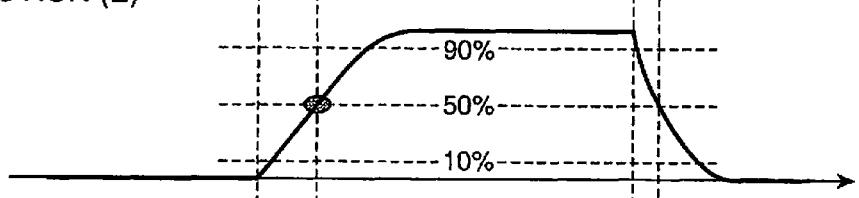
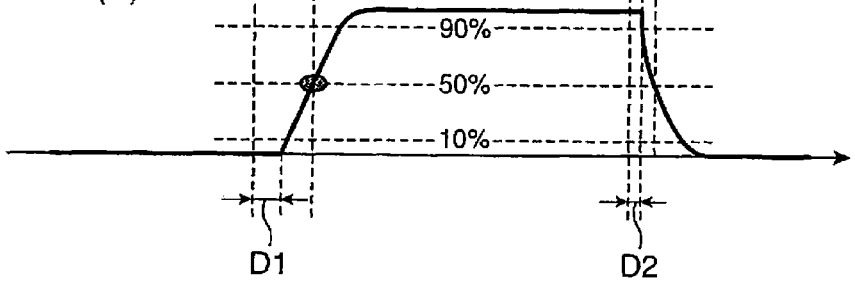

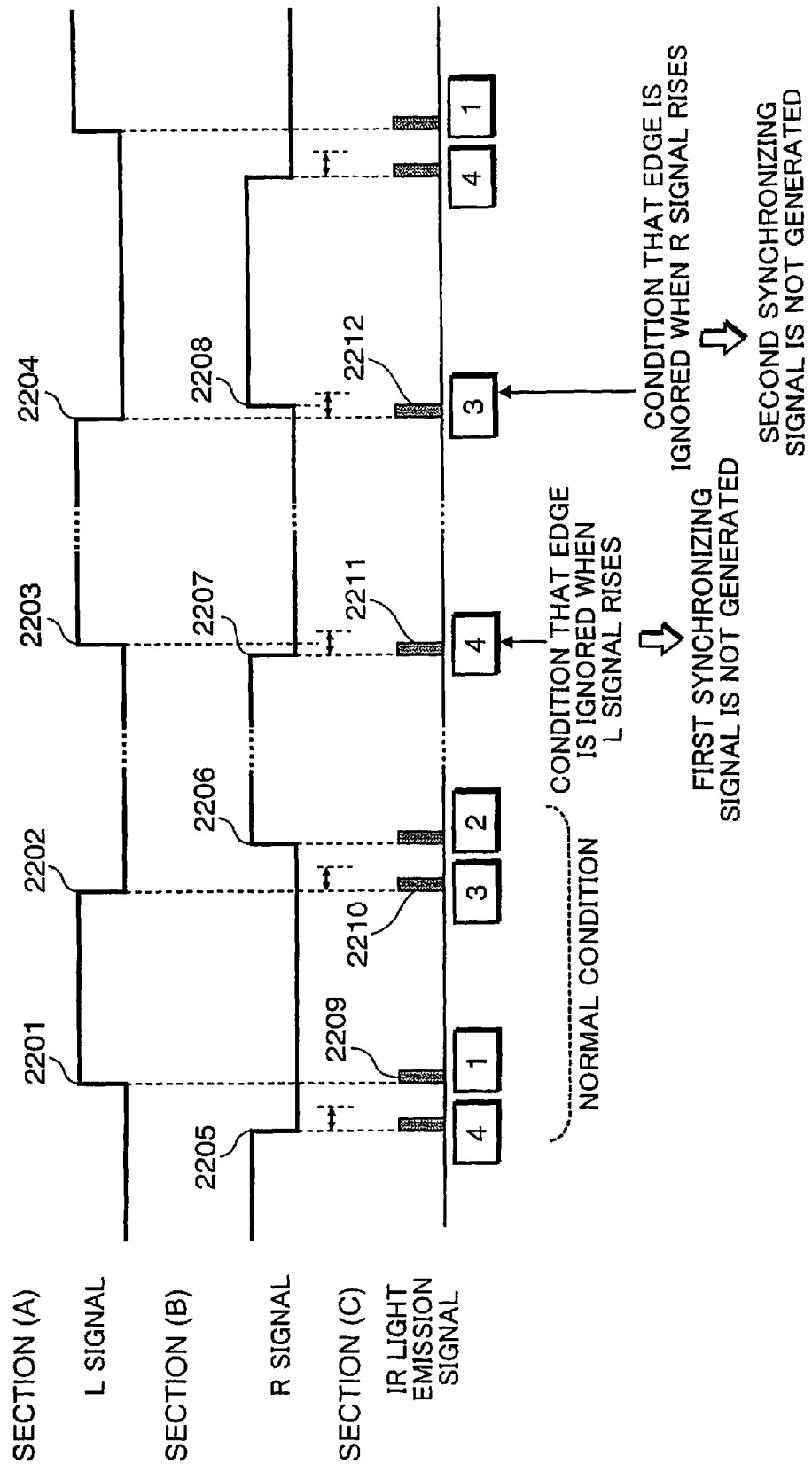

VIDEO DISPLAY APPARATUS, VIDEO VIEWING GLASSES, AND SYSTEM COMPRISING THE DISPLAY APPARATUS AND THE GLASSES

TECHNICAL FIELD

The present invention is related to technologies for allowing a viewer to view a video displayed on a video display apparatus through video viewing glasses, and more particularly to technologies for allowing the viewer to view the video on the video display apparatus through the video viewing glasses configured to select the video displayed on the video display apparatus.

BACKGROUND ART

A signal transmitted from a stereoscopic video display apparatus to notify a switching timing between videos for left and right eyes to liquid crystal shutter glasses may be potentially cut off for some reason. Japanese Unexamined Patent Publication No. H11-98538 discloses technologies for solving problems resulting from the signal cut-off such as disable stereoscopic viewing and screen flickering. The liquid crystal shutter glasses disclosed in Japanese Unexamined Patent Publication No. H11-98538 internally generates a signal for self-controlling the switching operation in response to a received signal from the stereoscopic video display apparatus to notify the switching timing. The liquid crystal shutter glasses control to switch liquid crystal shutters in response to the generated signal. Consequently, the switching operation of the liquid crystal shutters may be still controllable even if the liquid crystal shutter glasses temporarily fail to receive the signal from the stereoscopic video display apparatus, thereby solving the aforementioned problem. Even if there are a few clocks of the signal transmitted from the stereoscopic video display apparatus to notify the switching operation between videos for left and right eyes, the liquid crystal shutter glasses disclosed in Japanese Unexamined Patent Publication No. H11-98538 is operable to respond to the clocks.

Shutters of glasses may block light emission from a PDP (Plasma Display Panel) due to slow response speed if the shutters of the glasses are switched in synchronism with start of a sub-field to view a stereoscopic image displayed by the PDP. The technologies disclosed in Japanese Unexamined Patent Publication No. 2000-36969 aims to solve the problem by performing switching operation between a left eye shutter and a right eye shutter of glasses during a non-display period in a sub-field.

Patent Document 1: JP 11-098538 A
Patent Document 2: JP 2000-36969 A

Patent Document 1 does not disclose technologies for controlling a video display apparatus and/or video viewing glasses with taking account of differences among various types of video display apparatuses (e.g. an apparatus incorporated with a CRT (Cathode Ray Tube), an apparatus incorporated with a liquid crystal element such as an LCD (Liquid Crystal Display) and a PDP).

Patent Document 2 discloses the switching operation between the left and right liquid crystal shutters during a non-display period in a sub-field on a PDP which is used as a video display apparatus, but does not disclose technologies for controlling a video display apparatus and/or video viewing glasses with taking account of an influence on video display by a video display apparatus (e.g. effect of switching display between a left eye video and a right eye video on an image to be viewed).

SUMMARY OF THE INVENTION

An object of the invention is to provide improved video viewing technologies by means of a video display apparatus and video viewing glasses.

A video display apparatus according to one aspect of the invention to accomplish the aforementioned object is adapted to display a video to be viewed through video viewing glasses. The video display apparatus includes: a display section configured to display the video; a synchronizing signal generator configured to generate an external synchronizing signal in synchronism with the video to notify the video viewing glasses of a display end of a frame constituting the video; and a synchronizing signal transmitter configured to transmit the external synchronizing signal.

Video viewing glasses according to another aspect of the invention include: a synchronizing signal receiver configured to receive an external synchronizing signal in synchronism with a video, the external synchronizing signal notifying a display end of a frame constituting a video; an optical filter section including a pair of optical filters configured to adjust light amounts to be transmitted to a left eye and a right eye of a viewer, respectively; and an optical filter controller configured to control the optical filter section in response to the external synchronizing signal.

A video system according to yet another aspect of the invention is provided with a video display apparatus, and video viewing glasses used for viewing a video displayed on the video display apparatus. The video display apparatus includes: a display section configured to display a video; a synchronizing signal generator configured to generate an external synchronizing signal in synchronism with the video to notify a display end of a frame constituting the video; and a synchronizing signal transmitter configured to transmit the external synchronizing signal to the video viewing glasses. The video viewing glasses include: a synchronizing signal receiver configured to receive the external synchronizing signal; an optical filter section having a pair of optical filters configured to adjust light amounts to be transmitted to a left eye and a right eye of a viewer, respectively; and an optical filter controller configured to control the optical filter section in response to the external synchronizing signal.

BRIEF DESCRIPTION OF THE DRAWINGS

FIG. 6 is a schematic view exemplifying a stereoscopic video displayed by the video displayer shown in FIG. 3.

FIG. 7 is a schematic view exemplifying a relationship between a video frame in accordance with a sub-field drive shown in FIG. 5 and a synchronizing signal.

FIG. 21 is a schematic view describing differences in control of video viewing glasses depending on differences in response speed.

FIG. 22 is a schematic view showing a relationship between an internal signal generated by a synchronizing signal generator and a synchronizing signal transmitted by a synchronizing signal transmitter.

DESCRIPTION OF THE INVENTION (First Embodiment)
<1. Configuration of Video Display System>

Figure 1:
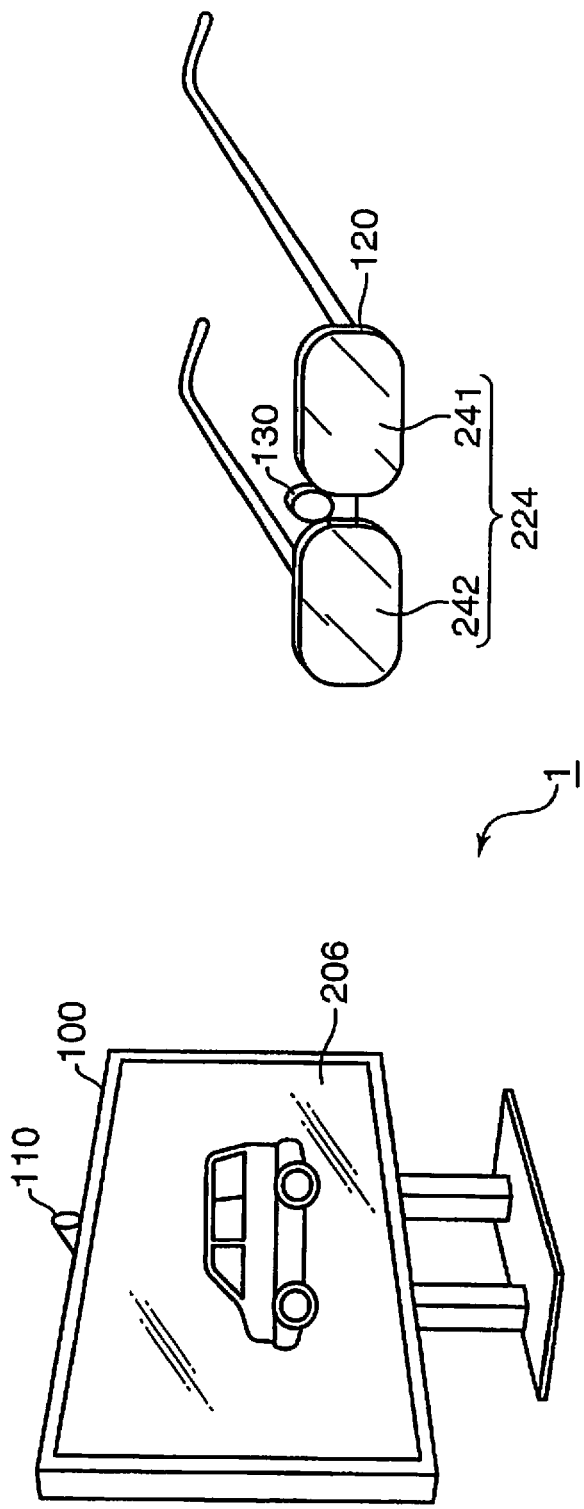
FIG. 1 is a schematic view showing a configuration of a video system according to one embodiment of the present invention.

FIG. 1 is a schematic view of a video display system comprising a video display apparatus and video viewing glasses used for viewing a video displayed on the video display apparatus. In this embodiment, a viewer may view a stereoscopic video displayed on a display screen of the video display apparatus through the video viewing glasses.

The video display system 1 shown in FIG. 1 includes the video display apparatus 100 configured to display the video, and video viewing glasses 120. The video display apparatus 100 includes a display panel 206. A left-eye video and a right-eye video are alternately displayed on the display panel 206. The left-eye and right-eye videos displayed on the video display apparatus 100 may be different in contents from each other by a parallax of the viewer's eyes.

The video viewing glasses 120 substantially look like vision correction eyeglasses as a whole. The video viewing glasses 120 include an optical filter section 224. The optical filter section 224 includes a left-eye optical filter 241 situated in front of the left eye of the viewer, and a right-eye optical filter 242 situated in front of the right eye of the viewer if the viewer wears the video viewing glasses 120. The video viewing glasses 120 adjust light amounts from the video, which are transmitted to the left and right eyes of the viewer through the left-eye and right-eye optical filters 241, 242, respectively. The adjustment for the light amount from the video is synchronized with the video, which is output to the display panel 206 of the video display apparatus 100. The viewer perceives the parallax in the videos viewed by the left and right eyes, so that the viewer recognizes the video displayed on the video display apparatus 100 as a stereoscopic video.

The video subjected to predetermined processes such as processes for a stereoscopic video (3D video) is output from the display panel 206 of the video display apparatus 100. A synchronizing signal transmitting section 110 of the video display apparatus 100 transmits a signal (external synchronizing signal) for synchronizing the video, which is output to the display panel 206 of the video display apparatus 100, with control operation of the video viewing glasses 120. The video viewing glasses 120 receive the external synchronizing signal from the video display apparatus 100. The video viewing glasses 120 perform predetermined optical processes to the light, which is then incident to the left and right eyes in response to the synchronizing signal. A synchronizing signal receiving section 130 of the video viewing glasses 120 receives the synchronizing signal from the synchronizing signal transmitting section 110 to adjust the light amount transmitted to the left and/or right eyes in response to the synchronizing signal. Therefore, the viewer wearing the video viewing glasses 120 may appropriately view the video displayed on the video display apparatus 100.

Figure 2:
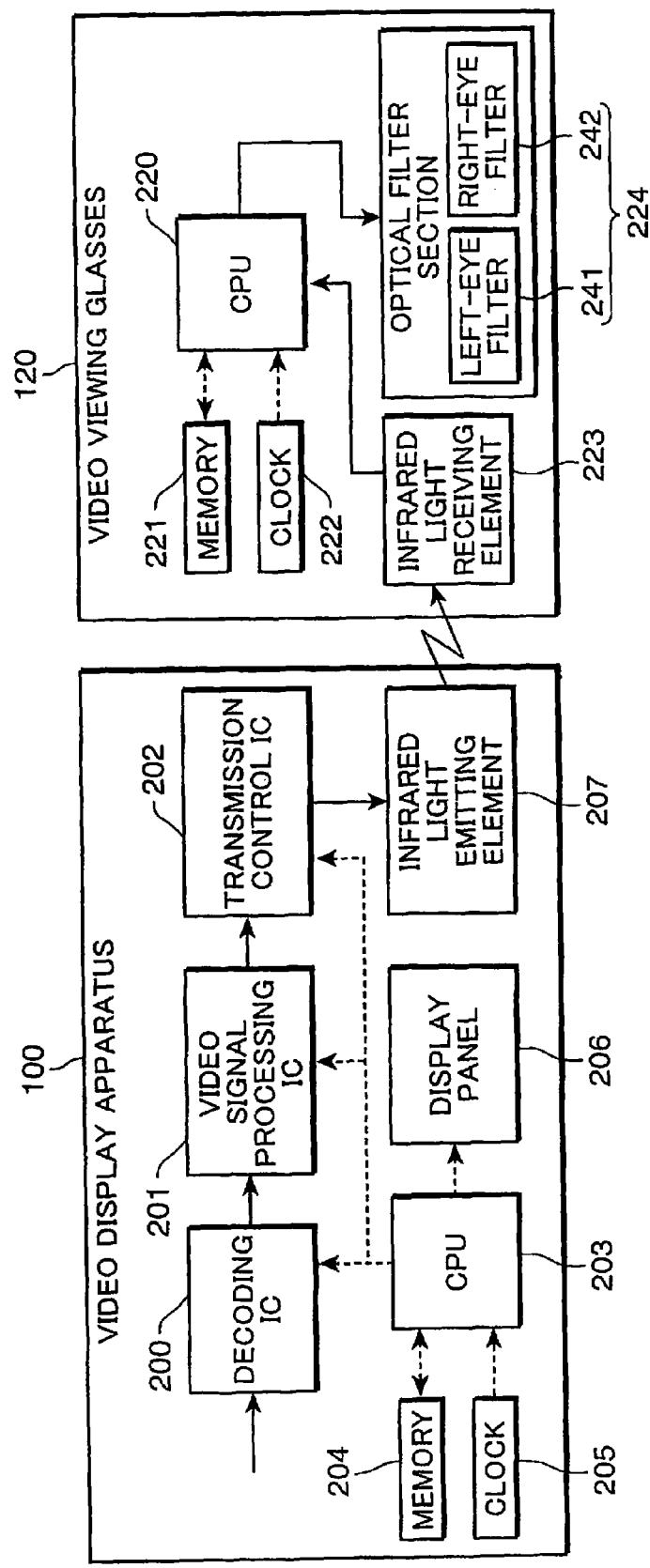
FIG. 2 is a block diagram showing a hardware configuration of the video system shown in FIG. 1.

FIG. 2 shows hardware configurations of the video display apparatus 100 and the video viewing glasses 120. The video display apparatus 100 includes a decoding IC 200, a video signal processing IC 201, a transmission control IC 202, a CPU 203, a memory 204, a clock 205, the display panel 206 and an infrared light emitting element 207.

An encoded video signal is input to the decoding IC 200, which decodes the encoded video signal to output video data in a predetermined format. The video encoding method may be MPEG (Motion Picture Experts Group)-2, MPEG-4 or H264.

The video signal processing IC 201 performs signal processes associated with display of a stereoscopic video. The video signal processing IC 201 processes the video signal from the decoding IC 200 to display the video data as a stereoscopic video. In a certain embodiment, the video signal processing IC 201 may detect left-eye and right-eye videos out of the video data decoded by the decoding IC 200 to alternately display the detected left-eye and right-eye videos with time. In another embodiment, the left-eye and right-eye videos may be automatically generated from the video data output from the decoding IC 200, and then the video signal processing IC 201 may alternately output the generated left-eye and right-eye videos to the display panel 206. After the signal processes about the display of the stereoscopic video, the video signal processing IC 201 generates an output signal in conformity with a signal input method of the display panel 206.

The video signal processing IC 201 may perform other processes than the aforementioned processes. For instance, the video signal processing IC 201 may further adjust hues of a displayed video or interpolate images between frames of video data generated by the decoding IC 200 to increase a frame rate of the video according to characteristics of the display panel 206.

The transmission control IC 202 generates synchronizing signals which synchronize with the left-eye and right-eye videos generated by the video signal processing IC 201. The transmission control IC 202 then outputs the generated synchronizing signals to the infrared light emitting element 207, which is described hereinafter in detail.

The CPU 203 entirely controls operations of the video display apparatus 100. The CPU 203 controls components included in the video display apparatus 100 (e.g. the decoding IC 200 and the video signal processing IC 201) to handle the overall operations of the video display apparatus 100. The CPU 203 may control the overall operations of the video display apparatus 100 in accordance with programs recorded in the memory 204, an input from an external device (not shown) or alike.

The memory 204 is utilized as a region where the programs executed by the CPU 203 and temporary data generated in the course of executing the programs are recorded. A volatile RAM (Random Access Memory) or a non-volatile ROM (Read Only Memory) may be used as the memory 204.

The clock 205 supplies a clock signal, which may be used as an operational reference for the ICs such as the CPU 203 and the other constituent components.

The display panel 206 displays a video signal output from the video signal processing IC 201. Various display methods such as a conventional CRT method, and systems using an LCD with a liquid crystal element, a PDP, and an organic electroluminescence may be applied to the display panel 206.

The infrared light emitting element 207 outputs the synchronizing signal to an external device as infrared light under the control of the transmission control IC 202.

In this embodiment, the video display apparatus 100 and the video viewing glasses 120 are synchronized with each other by means of the infrared light. The invention is not limited to this. The synchronization between the video display apparatus 100 and the video viewing glasses 120 may be established by means of a wired signal, a wireless signal, an ultrasonic wave or other transmission means.

The video viewing glasses 120 include a CPU 220, a memory 221, a clock 222, an infrared light receiving element 223 and the optical filter section 224.

The CPU 220 entirely controls operations of the video viewing glasses 120. The CPU 220 may control the video viewing glasses 120, for example, in accordance with programs recorded in the memory 221 or an input from an external device (not shown).

The memory 221 is used as a region where data of programs executed by the CPU 220 are recorded or temporary data generated in the course of executing the programs are saved.

The clock 222 supplies a clock signal, which is used as an operational reference, to other ICs constituting the video viewing glasses 120. Optionally, the clock signal may be a frequency-dividing or frequency-multiplying signal.

The infrared light receiving element 223 is a light receiving section configured to receive a synchronizing signal which has been transmitted from the infrared light emitting element 207 of the video display apparatus 100.

The optical filter section 224 is situated in front of the left and right eyes of a user wearing the video viewing glasses 120 to adjust the transmitted light amounts to the left and right eyes. The optical filter section 224 appropriately adjusts the light toward the left and right eyes under the control of the CPU 220 to give intended optical effects to the user wearing the glasses 120.

The present invention is not limited to the exemplary hardware configuration shown in FIG. 2. For instance, the hardware may include an integrated IC corresponding to several ICs such as the decoding IC 200 and the video signal processing IC 201. Further alternatively, execution processes for programs by the CPU 203 may be performed, for example, by a PLD (Programmable Logic Device).

Figure 3:
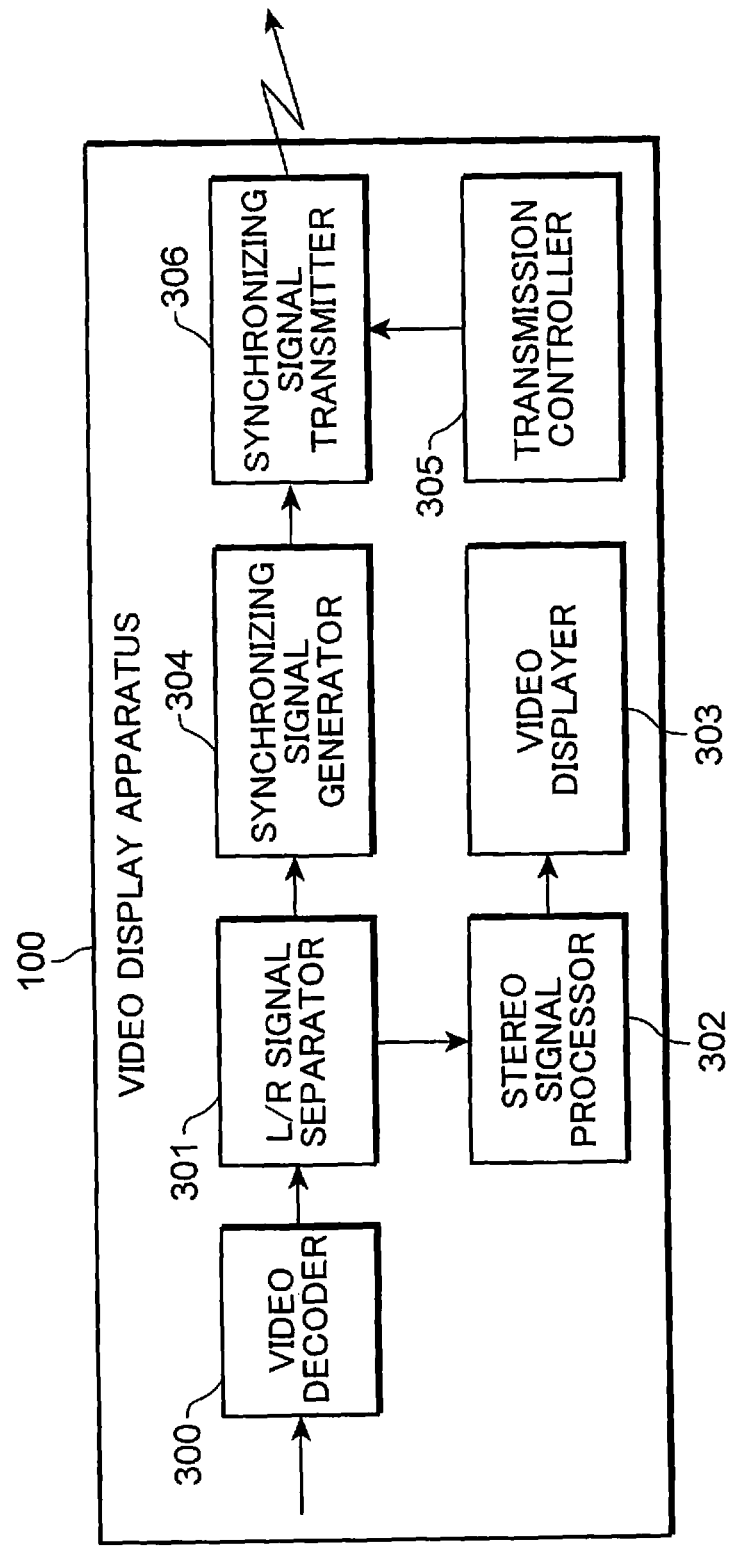
FIG. 3 is a block diagram showing a functional configuration of a video display apparatus shown in FIG. 1.

FIG. 3 is a block diagram showing a functional configuration of the video display apparatus 100. The video display apparatus 100 includes a video decoder 300, an L/R signal separator 301, a stereo signal processor 302, a video displayer 303, a synchronizing signal generator 304, a transmission controller 305 and a synchronizing signal transmitter 306.

An encoded video signal is input to the video decoder 300, so that the video decoder 300 decodes the video signal. The video decoder 300 corresponds to the decoding IC 200 in the hardware configuration shown in FIG. 2.

The L/R signal separator 301 generates video signals for the left and right eyes from a video signal decoded by the video decoder 300 or separates the video signal decoded by the video decoder 300 into video signals for the left and right eyes.

The stereo signal processor 302 adjusts the left-eye and right-eye video signals separated by the L/R signal separator 301, for example, in accordance with characteristics of the video displayer 303 configured to display a video, which is viewed through the video viewing glasses 120. For instance, the stereo signal processor 302 may adjust a parallax between the left-eye and right-eye videos in accordance with a size of a display screen of the video displayer 303. The video displayer 303 exemplified in FIG. 3 as a display section corresponds to the display panel 206 depicted in FIGS. 1 and 2.

The synchronizing signal generator 304 generates a synchronizing signal in synchronism with or corresponding to the left-eye and right-eye videos generated by the L/R signal separator 301. For example, types or generation timing of a synchronizing signal are adjusted in accordance with the characteristics of the video displayer 303. The synchronizing signal is described hereinafter.

The L/R signal separator 301, the stereo signal processor 302 and the synchronizing signal generator 304 correspond to the video signal processing IC 201 in the hardware configuration shown in FIG. 2.

The video displayer 303 displays a video signal, which has processed by the stereo signal processor 302, as a video. As described above, the video displayer 303 corresponds to the display panel 206 in the hardware configuration shown in FIG. 2.

The synchronizing signal transmitter 306 transmits the synchronizing signal generated by the synchronizing signal generator 304 to the external device (video viewing glasses 120) under the control of the transmission controller 305 (as described hereinafter). The synchronizing signal transmitter 306 corresponds to the infrared light emitting element 207 in the hardware configuration shown in FIG. 2.

The transmission controller 305 controls a data volume, data transmission interval and alike of the synchronizing signal, which is then transmitted. It is described hereinafter how the transmission controller 305 controls them. The transmission controller 305 corresponds to the transmission control IC 202 in the hardware configuration shown in FIG. 2.

Figure 4:
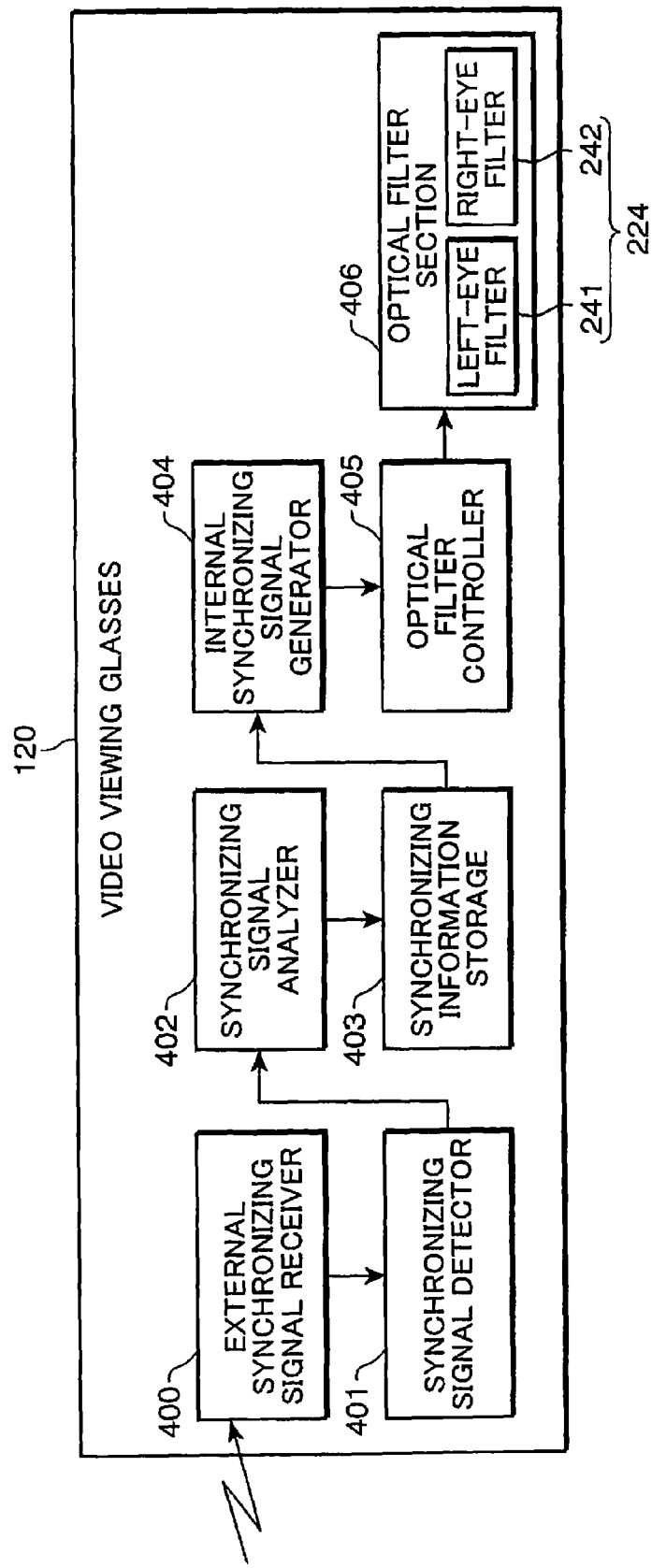
FIG. 4 is a block diagram showing a functional configuration of video viewing glasses shown in FIG. 1.

FIG. 4 is a block diagram showing a functional configuration of the video viewing glasses 120. The video viewing glasses 120 include an external synchronizing signal receiver 400, a synchronizing signal detector 401, a synchronizing signal analyzer 402, a synchronizing information storage 403, an internal synchronizing signal generator 404, an optical filter controller 405 and the optical filter section 224.

The external synchronizing signal receiver 400 receives a synchronizing signal as infrared light transmitted from the video display apparatus 100. The external synchronizing signal receiver 400 converts the received infrared light into an electrical signal, which is then output to the synchronizing signal detector 401 (as described hereinafter). The external synchronizing signal receiver 400 corresponds to the infrared light receiving element 223 in the hardware configuration shown in FIG. 2.

The synchronizing signal detector 401 detects the synchronizing signal (electrical signal) converted from the infrared light received by the external synchronizing signal receiver 400. For example, the synchronizing signal is detected as a predetermined electrical signal waveform.

The synchronizing signal analyzer 402 analyzes information such as a time interval, which is used for operating the optical filter section 224 (as described hereinafter) in response to the synchronizing signal detected by the synchronizing signal detector 401. For example, the information (such as the time interval information) for operating the optical filter section 224 may include information associated with timings of opening/closing the left-eye and right-eye optical filters 241, 242. Analysis on the information including the time interval information is described hereinafter.

The synchronizing signal detector 401 and the synchronizing signal analyzer 402 correspond to a part of programs executed by the CPU 220 in the hardware configuration shown in FIG. 2.

The synchronizing signal analyzer 402 analyzes control information associated with operation of the optical filter section 224 on the basis of the synchronizing signal, and then the synchronizing information storage 403 records/stores the control information. The synchronizing signal storage 403 corresponds to the memory 221 in the hardware configuration shown in FIG. 2. The CPU 220 records the control information in the memory 221.

The internal synchronizing signal generator 404 generates a synchronizing signal in the video viewing glasses 120 on the basis of the synchronizing information, which is recorded in the synchronizing information storage 403 or analyzed by the synchronizing signal analyzer 402. The internal synchronizing signal generator 404 corresponds to the CPU 220 and the clock 222 in the hardware configuration shown in FIG. 2.

The optical filter controller 405 controls operations of the left-eye and right-eye optical filters 241, 242 of the video viewing glasses 120 (e.g. adjusting the transmitted light amount through the optical filter section 224). The optical filter controller 405 corresponds to programs which the CUP 220 in the hardware configuration shown in FIG. 2 executes to control the optical filters.

The optical filter section 224 includes the paired optical filters 241, 242 configured to adjust the light amounts, which is then transmitted and incident to the left and right eyes. As shown in FIG. 1, the paired optical filters 241, 242 are mounted on the video viewing glasses 120. The optical filters 241, 242 include various kinds of filters such as a filter for adjusting the transmitted light amount and a filter for adjusting the deflection of the transmitted light. The optical filters 241, 242 may further include a liquid crystal element, which is controlled to adjust the transmitted light amount. The optical filter section 224 in the hardware configuration shown in FIG. 2 is indicated with the same reference numeral as in FIG. 1.

In this embodiment, the video displayed on the video display apparatus 100 includes the left-eye and right-eye videos. The left-eye and right-eye videos are alternately switched. The left-eye and right-eye optical filters 241, 242 of the optical filter section 224 are operated like shutters for alternately decreasing and increasing the transmitted light amounts. Operations performed by the optical filter section 224 are not limited to the operations described in this embodiment. As another example of the operations performed by the optical filter section 224, the left-eye and right-eye optical filters may be operated to change deflection directions. All kinds of the optical filters 241, 242 to adjust the transmitted light amounts in synchronism with the alternate display operation of the video frame may be applied to the optical filter section 224.

The present invention is not limited to the functional configurations shown in FIGS. 3 and 4. For instance, in the descriptions in the context of FIGS. 3 and 4, the synchronizing signal transmitter 306 and the video displayer 303 are included in the video display apparatus 100. Alternatively, the synchronizing signal transmitter 306 and the video displayer 303 may be provided in individual apparatuses, respectively. For instance, a video display apparatus with functions of merely displaying a video and a synchronizing signal transmitting device for transmitting and outputting a synchronizing signal may be provided as the individual apparatuses.

The present invention is not limited to the exemplary correlation between the hardware and functional configurations, which are used to describe the aforementioned embodiment. Other hardware and functional configurations may be applied to the present invention.

<2. Synchronizing System in Accordance with Characteristics of Video Displayer>

Figure 5:
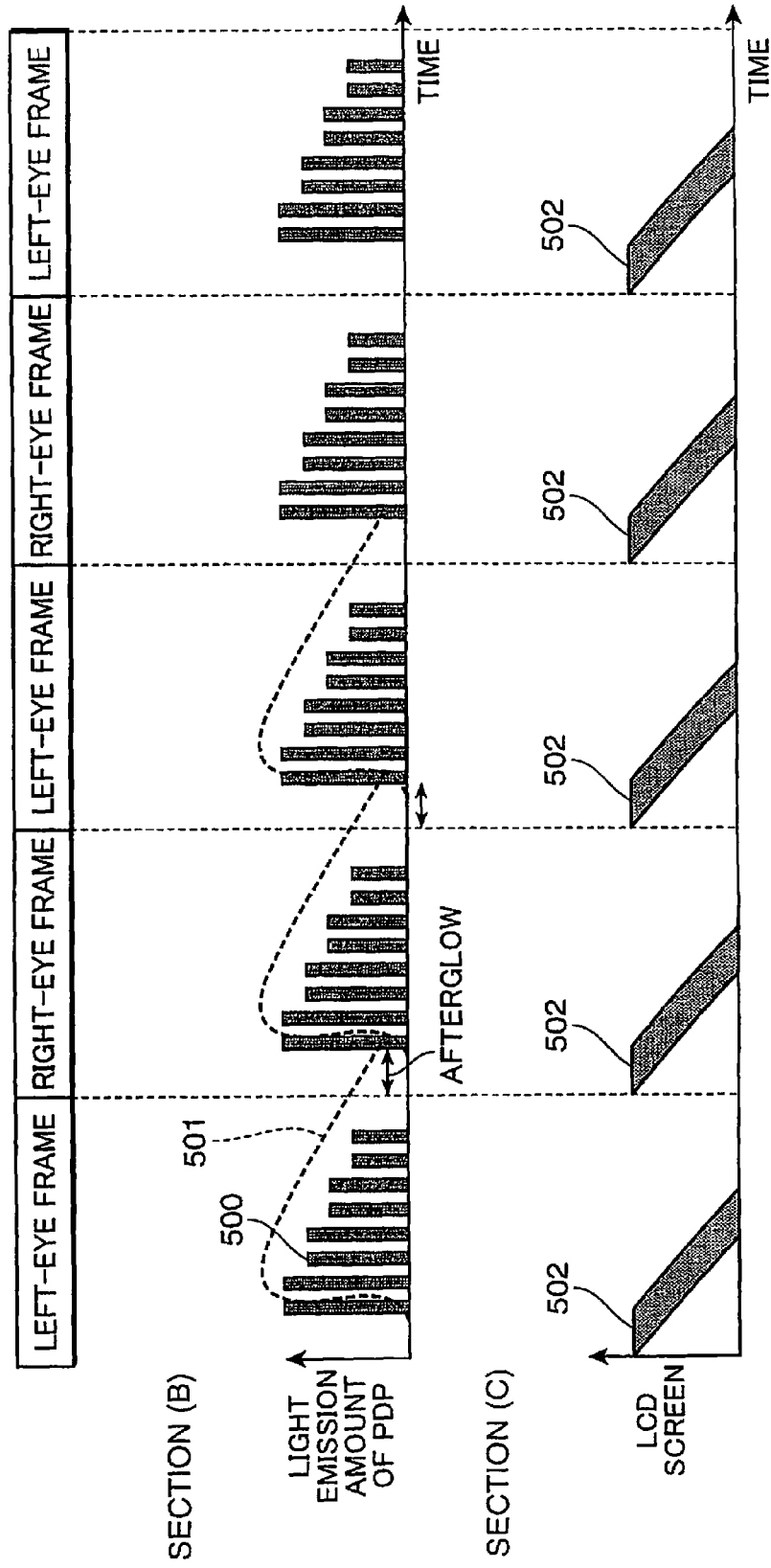
FIG. 5 is a schematic view describing differences in light emitting method depending on a display method of a video displayer shown in FIG. 3.

FIG. 5 is a schematic view describing differences in light emitting method depending on a display method of the video displayer 303. FIG. 6 is a schematic view exemplifying images of left-eye and right-eye frames shown in FIG. 5. The video display apparatus 100 displays a video on the video displayer 303. The characteristics of the video displayer 303 greatly differ depending on a display method of the display section. FIG. 5 shows display characteristics of a PDP, which may be used as the video displayer 303 (display panel 206), and display characteristics of an LCD, which may be also used as the video displayer 303 (display panel 206). The section (A) in FIG. 5 shows that frame displays of the left-eye and right-eye videos are alternately switched so that the video display apparatus 100 displays a stereoscopic video. FIG. 5 shows that the left-eye and right-eye frames are alternately displayed on the display panel 206 in order to clarify the descriptions although the invention is not limited to this. For instance, the display system may switch between the left-eye right-eye frames every several frames.

FIG. 6 is a schematic view exemplifying videos for the left-eye and right-eye frames shown in FIG. 5, which are displayed on the display panel 206. The upper display panel 206 in FIG. 6 displays the video for the left-eye frame whereas the lower display panel in FIG. 6 displays the video for the right-eye frame. Although the objects "A" displayed in both frames are identical to each other, display positions and viewing angles of the objects "A" on the display panels 206 are slightly different from each other. The differences in the display positions and the viewing angles may be defined as a difference in contents by a parallax in the viewer's eyes between videos in the left-eye and right-eye frames. The object "A" in FIG. 6 is spherical to simplify the descriptions, so that differences in shape are not recognized between the left-eye and right-eye frames. However, an object displayed in the left-eye frame may be different in shape from a displayed object in the right-eye frame by the parallax amount depending on the shape of the object "A". FIG. 6 clearly describes the differences in display contents corresponding to the parallax between the left-eye and right-eye frames but it should be noted that other differences between videos viewed by the left and right eyes may be included in the differences in contents corresponding to the parallax. The differences in display contents corresponding to the parallax between the left-eye and right-eye frames shown in FIG. 6 are shown to clarify the descriptions. It should be noted that other differences between videos viewed by the left and right eyes may mean differences in contents by the parallax.

Referring back to FIG. 5, the section (B) in FIG. 5 shows light emission amounts from a PDP which is used as the video displayer 303. In the light emission from the PDP, light emitting periods (called as sub-fields) obtained by time-dividing a frame are used. The gradations of a frame are adjusted by combining light emission amounts different from each other per every sub-field. Electrical discharged amounts 500 represented by bars in the bar graph in FIG. 5 correspond to light emission amounts of the video displayer 303 in sub-fields, respectively. A light emission amount 501 indicated by the curve in FIG. 5 represents a time-variation in light emission amounts of individual pixels in the video displayer 303. The light emission amounts 501 of the video displayer 303 slightly delays from the discharged amounts 500 in the sub-fields, respectively. For example, the delay may result from response characteristics of fluorescent elements, which are sealed in the pixels, respectively, at the time of brightening the pixels or afterglow characteristics of the fluorescent elements at the time of darkening the pixels.

If a PDP is used as the video displayer 303 (display panel 206), preferably, the synchronizing signal generator 304 shown in FIG. 3 may generate and transmit a synchronizing signal with taking account of such display characteristics of the video displayer 303. For example, if the PDP is used as the video displayer 303, as described above, there is a time lag between an input signal, which is used for light emission for a sub-field, and actual light emission of a fluorescent element. In particular, as indicated by the light emission amount 501 represented by the curve, a part of light emission in the left-eye frame, which lies in the right-eye frame, becomes afterglow (crosstalk) which affects the light emission in the right-eye frame. The afterglow greatly affects stereoscopic video display. If a video in the left-eye frame remains as the afterglow in a video in the right-eye frame, the viewer may recognize the afterglow of the left-eye frame as a part of the video of the right-eye frame while the viewer views the video in the right-eye frame (in other words, the video in the left-eye frame visually affects the video viewed by the right eye). As a result, the video display apparatus 100 may provide the viewer viewing a video through the video viewing glasses 120 with an unclear stereoscopic video.

The section (C) in FIG. 5 shows display characteristics of the video displayer 303 (display panel 206) for which an LCD is used. Like a CRT and so on, the LCD successively controls the pixels along a scanning line (an area indicated by the numeral 502 means that a screen is scanned (a video is written over)), respectively, to display a video on the display screen. Because of the display characteristics of the LCD, while the pixels are scanned, a video before scanning and an updated video after scanning coexist on the display screen of the LCD (a video is distorted). In particular, if left-eye and right-eye videos are alternately displayed for the stereoscopic video view, the coexistence of the left-eye and right-eye videos during the scanning operation distorts the video. As a result, it becomes less likely the viewer stereoscopically views the video displayed by the video display apparatus 100 through the video viewing glasses 120.

FIG. 7 exemplifies generation of a synchronizing signal by a PDP which is used as the video displayer 303. The exemplary synchronizing signal generator 304 generates the synchronizing signal with taking account of the characteristics of the video displayer 303.

The section (A) in FIG. 7 shows a video displayed on the video displayer 303. As described in the context of FIGS. 5 and 6, videos in left-eye and right-eye frames are also alternately displayed in the example shown in FIG. 7. The section (B) in FIG. 7 shows synchronizing signals (pulses) which are generated and transmitted in synchronism with the video displayed on the video displayer 303.

The section (C) in FIG. 7 exemplifies control for the light amount transmitted from the PDP (i.e. the video displayer 303) in response to a synchronizing signal shown in the section (B) in FIG. 7, which is transmitted from the video display apparatus 100. The video displayer 303 controls light emission in sub-fields corresponding to videos in the left-eye and right-eye frames to display the videos of the left-eye and right-eye frames. As a result of the control operation, light is emitted from the display screen of the video displayer 303 in response to a video signal as shown by a graphical curve 711. In this case, a video in one of the frames may affect a video in the other the frames. In the example shown in FIG. 7, afterglow in the left-eye frame may affect the right-eye frame whereas afterglow in the right-eye frame may affect the left-eye frame.

The synchronizing signal generator 304 controls a synchronizing signal, which is transmitted to the video viewing glasses 120, to prevent the afterglow from affecting video view. The synchronizing signal generator 304 generates a signal to appropriately control the optical filter section 224 of the video viewing glasses 120. The synchronizing signal generator 304 controls the synchronizing signal so that the afterglow in the left-eye frame may not affect view of the right-eye frame whereas the afterglow in the right-eye frame may not affect view of the left-eye frame. The synchronizing signal generator 304 generates the synchronizing signal in association with display characteristics (e.g. response characteristics at the time of brightening the pixels or afterglow characteristics at the time of darkening the pixels) of the video displayer 303, so that the left-eye and right-eye optical filters 241, 242 of the optical filter section 224 of the video viewing glasses 120 are controlled in response to the synchronizing signal.

The section (B) in FIG. 7 shows exemplary synchronizing signals (pulses) generated by the synchronizing signal generator 304. The synchronizing signal generator 304 generates synchronizing signals for controlling the optical filter section 224 of the video viewing glasses 120 in correspondence to start (the first light emission of sub-fields in one frame) and end (the last light emission of sub-fields in the one frame) of a display frame.

This embodiment may be characterized in generating a synchronizing signal for controlling the video viewing glasses 120 at the display end of a frame, in addition to the display start the frame, in order to control the optical filter section 224. If a synchronizing signal is output merely at the beginning of a display frame, the afterglow may not become sufficiently less influential. The optical filter section 224 may not instantaneously respond to a synchronizing signal, so that it may take a certain time to open/close the filter. If only one synchronizing signal at the beginning of the display frame is used for controlling the optical filter section 224 at a single timing, an unintended video on the video displayer 303 may be inadvertently recognized by the eye of the viewer during an opening/closing time of the filter. As described hereinafter, in order to avoid the aforementioned drawbacks, it is necessary to transmit a synchronizing signal at the end of a display frame, in addition to the transmission at the beginning of the display frame. A known approach proposes that a synchronizing signal is transmitted from the synchronizing signal transmitter 306 at one of display start timing and display end timing while the video viewing glasses 120 measure a time with the internal clock 222 to automatically shift timings of light blocking operation and light transmitting operation of the optical filter section 224. However, such known approach may not be applicable to various display characteristics of display devices, as described hereinafter.

FIG. 8 exemplifies a first synchronizing signal 700 and/or 701, and a second synchronizing signal 702 and/or 703 shown in FIG. 7. As shown in FIG. 7, in this embodiment, the first synchronizing signal 700, 701, and the second synchronizing signal 702, 701 are received by the external synchronizing signal receiver 400 as the synchronizing signals.

The synchronizing signals received by the external synchronizing signal receiver 400 are transmitted to the synchronizing signal analyzer 402 via the synchronizing signal detector 401. The synchronizing signal analyzer 402 discriminates the first synchronizing signal 700, 701 from the second synchronizing signal 702, 703. In the example shown in FIG. 7, the first synchronizing signal 700, 701 is recorded in the synchronizing information storage 403 as a signal to be used for control to make the left-eye optical filter 241 opened/closed. The second synchronizing signal 702, 703 is recorded in the synchronizing information storage 403 as a signal to be used for control to make the right-eye optical filter 242 opened/closed. The internal synchronizing signal generator 404 reads out the signal recorded in the synchronizing signal storage 403, and then generates an internal synchronizing signal for controlling the optical filter section 224 with the optical filter controller 405.

Figure 8A:
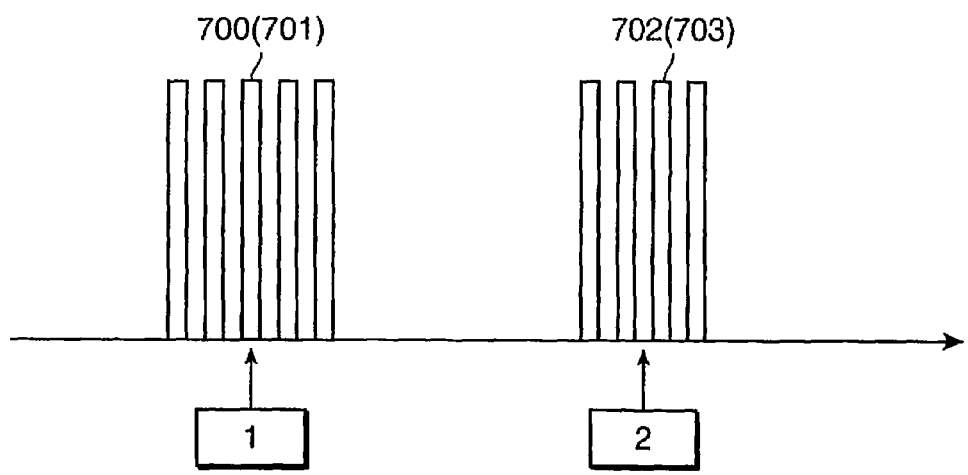
FIGS. 8A and 8B are schematic views exemplifying a synchronizing signal to be transmitted by a transmission controller shown in FIG. 3.
Figure 8B:
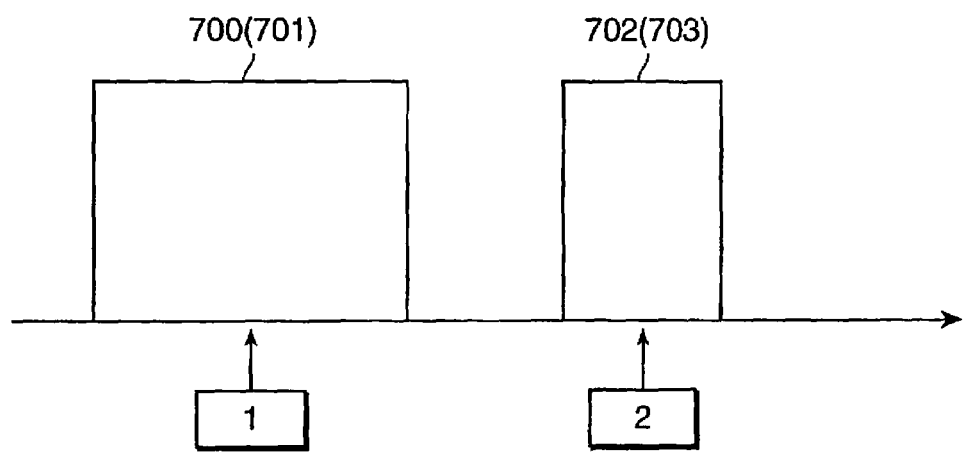

As shown in FIG. 8A, a pulse number within a predetermined time differs between the first synchronizing signal 700, 701, and the second synchronizing signal 702, 703, which are used in this embodiment. The synchronizing signal analyzer 402 may discriminate the first synchronizing signal 700, 701 from the second synchronizing signal 702, 703 on the basis of the difference in the pulse number. In the example shown in FIG. 7, the synchronizing signal analyzer 402 discriminates the subsequently transmitted synchronizing signal out of the successively transmitted two synchronizing signals 701, 703 having an identical waveform, as a synchronizing signal for closing the optical filter. As shown in FIG. 8B, in this embodiment, it may depend on a difference in pulse width between the first synchronizing signal 700, 701, and the second synchronizing signal 702, 703 that the first synchronizing signal 700, 701 is discriminated from the second synchronizing signal 702, 703. Further alternatively, in this embodiment, it may be depend on a difference in waveform other than the pulse number and the pulse width between the first synchronizing signal 700, 701, and the second synchronizing signal 702, 703 that the first synchronizing signal 700, 701 is discriminated from the second synchronizing signal 702, 703.

Referring back to FIG. 7, the synchronizing signal generator 304 generates the synchronizing signal 700, 702 for an increase in the transmitted light amount through the optical filter section 224 (open the optical filter section 224) at a timing when afterglow in a preceding frame becomes less influential after light emission for a sub-field is started. In this embodiment, the timing when afterglow becomes less influential means a point of time at which the afterglow in the preceding frame becomes lower than a predetermined threshold value. Alternatively the timing may mean a point of time at which the afterglow becomes relatively less influential because of starting light emission for a sub-field in the succeeding frame (i.e. a condition that a ratio of the afterglow to the light emission amount becomes equal or lower than a predetermined threshold value) even if there remains the afterglow of the preceding frame. The present invention may not be limited to the aforementioned method. Other methods may be used to evaluate and measure the afterglow. Any method for generating a synchronizing signal on the basis of an influence by the afterglow may be applied to this embodiment.

Figure 9:
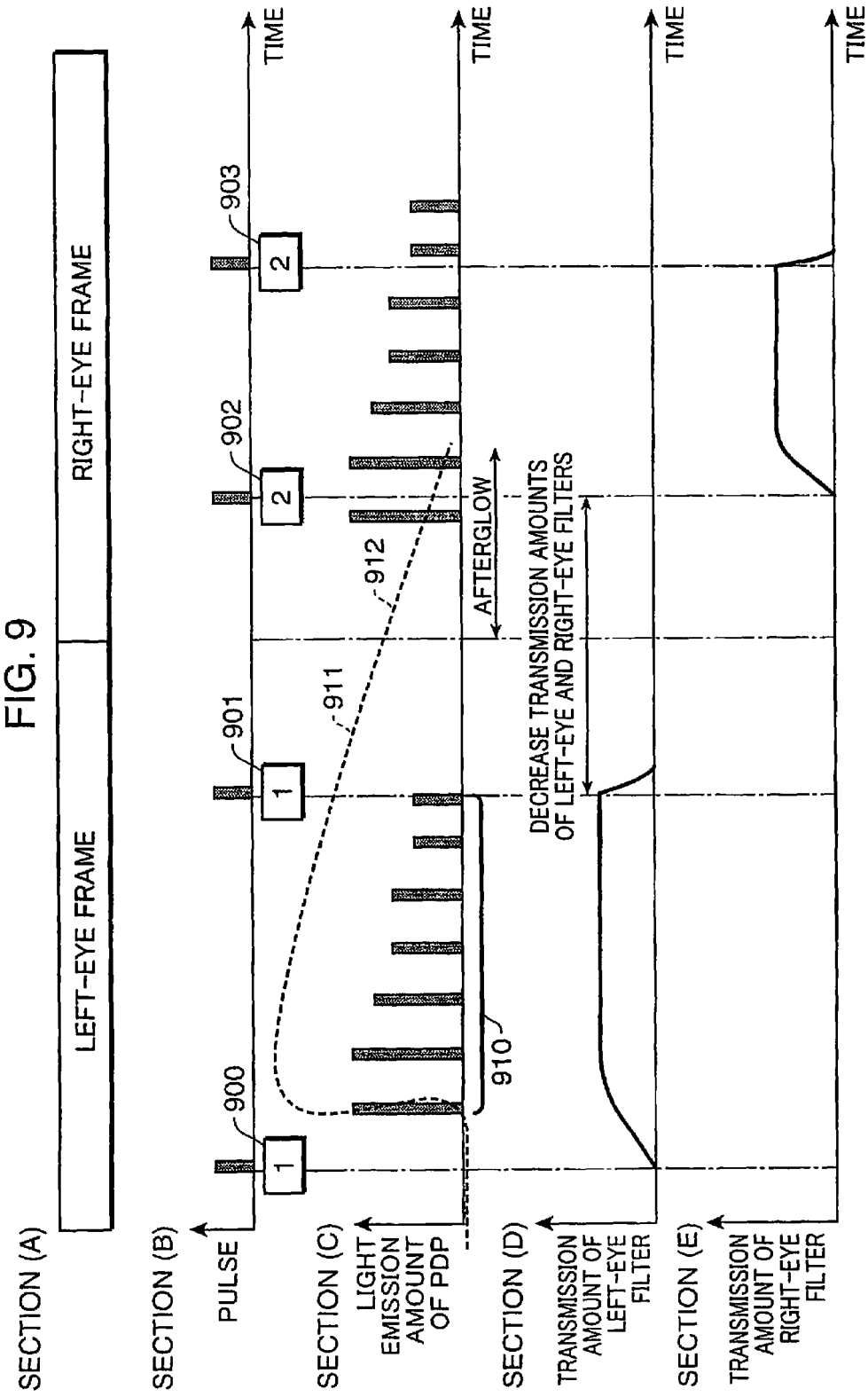
FIG. 9 is a schematic view exemplifying a relationship between generation of a synchronizing signal by the synchronizing signal generator shown in FIG. 3 and control for an optical filter section.

The embodiment is described in detail in context of FIG. 9. The synchronizing signal generator 304 generates a first synchronizing signal 900 for opening the left-eye optical filter 241 of the optical filter section 224 (increasing the transmitted light amount through the left-eye optical filter 241) in correspondence to display start of a left-eye frame. In the left-eye frame shown in the sections (B) and (C) in FIG. 9, the synchronizing signal generator 304 generates the first synchronizing signal 900 before the first light emission of sub-fields in the left-eye frame is started. Upon completion of the light emission for all the sub-fields in the left-eye frame, the synchronizing signal generator 304 generates a succeeding first synchronizing signal 901 for closing the left-eye optical filter 241 (decreasing the transmitted light amount through the left-eye optical filter 241). By the end of the last light emission of the sub-fields in the left-eye frame, the synchronizing signal generator 304 generates the succeeding first synchronizing signal 901. Meanwhile, the left-eye optical filter 241 of the optical filter section 224 performs an operation indicated in the left-eye frame in the section (D) of FIG. 9. Thus, the left-eye optical filter 241 is opened (the transmitted light amount becomes relatively large) during a period from the first synchronizing signal 900 to the succeeding first synchronizing signal 901, so that the viewer may view a video in the left-eye frame. In the example shown in FIG. 9, the first synchronizing signal 900 initially transmitted while a video in the left-eye frame is displayed functions as a synchronizing signal for increasing the transmitted light amount from a video to the left eye; and the first synchronizing signal 901 which is subsequently transmitted functions as a synchronizing signal for decreasing the transmitted light amount from a video to the left eye.

By the light emission for the sub-fields in the left-eye frame, the display panel 206 (i.e. the video displayer 303) may emit light of a video, as shown by a graphical curve 911. Generally, the light emission 911 indicated by the curve in FIG. 9 delays from drive of a sub-field 910. The light emission 911 in the left-eye frame may remain as afterglow 912 in the right-eye frame, for example, attribute to a display method, a display device or display characteristics of the video displayer 303. The afterglow 912 adversely affects video view in the left-eye frame. If the synchronizing signal generator 304 generates a second synchronizing signal, which is used for control to open the right-eye optical filter 242 simultaneously or successively with generation of the first synchronizing signal 901 used for control to close the left-eye optical filter 241, the afterglow 912 may be likely to affect light emission in the right-eye frame. Thus it becomes less likely that the viewer appropriately views a video displayed on the video display apparatus 100.

In this embodiment, opening/closing operations of the left-eye and right-eye optical filters 241, 242 are individually and independently controlled, instead of simultaneously switching the transmitted light amounts through the left-eye and right-eye optical filters 241, 242 of the optical filter section 224 in synchronism with the switching operation between the left-eye and right-eye frames. Therefore the afterglow on the display panel 206 becomes less influential on video view. In this embodiment, there is a blind period during which both of the left-eye and right-eye optical filters 241, 242 are closed from when one of the optical filters is closed (to decrease the transmitted light amount) to when the other of the optical filters is opened (to increase the transmitted light amount). The afterglow becomes less influential on the viewer viewing a video because both of the left-eye and right-eye optical filters 241, 242 are closed during the blind period. Therefore, the viewer may not view the video in this blind period.

The synchronizing signal generator 304 generates synchronizing signals for individually opening/closing the left-eye and right-eye optical filters 241, 242, instead of generating a synchronizing signal according to a conventional control which simultaneously switches the opening/closing operation of the left-eye and right-eye optical filters 241, 242 of the optical filter section 224. The video display apparatus 100 generates synchronizing signals (pulses) for closing the left-eye and right-eye optical filters 241, 242. The video viewing glasses 120 then generates internal synchronizing signals corresponding to the synchronizing signals by means of the internal synchronizing signal generator 404. The optical filter controller 405 controls the corresponding optical filter 241, 242 in response to the internal synchronizing signal, to decrease the transmitted light amount. Therefore, while the left-eye and right-eye frames are switched from each other, the video viewing glasses 120 create a blind condition in which the left-eye and right-eye optical filters 241, 242 of the optical filter section 224 are closed (the transmitted light amounts through the left-eye and right-eye optical filters 241, 242 are decreased). Accordingly, the synchronizing signal, which makes the left-eye and right-eye optical filters 241, 242 of the optical filter section 224 closed, is likely to prevent the viewer from viewing the afterglow on the video displayer 303 or a video in which afterglow of the preceding frame video and video light of the succeeding frame coexist.

The synchronizing signal generator 304 may adjust a generation timing of a synchronizing signal to synchronize a blind period, during which the left-eye and right-eye optical filters 241, 242 of the optical filter section 224 are closed, with a switching period of frames during which afterglow occurs on the video displayer 303. The video viewing glasses 120 controls the optical filter section 224 in response to the synchronizing signal, so that the viewer may view a video with less influential afterglow.

In this embodiment, the synchronizing signal generator 304 generates a synchronizing signal for closing the optical filter section 224 simultaneously with completion of light emission for the last sub-field among sub-fields in a frame. The invention is not limited to this. Alternatively, the synchronizing signal for closing the optical filter section 224 may be generated at a timing to switch from the left-eye frame to the right-eye frame shown in the section (A) in FIG. 7. In an alternative embodiment, the synchronizing signal generator 304 may generate a synchronizing signal for opening one of the left-eye and right-eye optical filters 241, 242 after the influence of the afterglow becomes no more than a predetermined threshold value.

As further yet another embodiment, the synchronizing signal generator 304 may generate a synchronizing signal for closing the optical filter section 224 before light emission for a sub-field in the succeeding frame (right-eye frame) is started if the afterglow in the preceding frame (left-eye frame) becomes no more than a predetermined threshold value.

For example, if the left-eye and/or right-eye optical filters 241, 242 of the optical filter section 224 is slow (slow response), the synchronizing signal generator 304 may generate a synchronizing signal for closing the optical filter section 224 before light emission for the last sub-field among sub-fields in a frame is started, as shown by a second synchronizing signal 903. In this case, the optical filter section 224 is actually closed after light emission for all the sub-fields in the frame is ended because the operation speed (characteristics) of the optical filter section 224 is taken into account.

In this embodiment, the synchronizing signal generator 304 generates a synchronizing signal for opening the left-eye and/or right-eye optical filters 241, 242 of the optical filter section 224 (increasing the transmitted light amount) corresponding to start of a frame, before light is turned on for sub-field drive. The invention is not limited to this. For instance, if the afterglow in the preceding frame is largely influential, the synchronizing signal generator 304 may generate a synchronizing signal for opening the right-eye optical filter 242 after light emission for a sub-field in a succeeding frame (right-eye frame) is started, as shown by a second synchronizing signal 902. Thus the afterglow of the preceding frame (left-eye frame) may advantageously become less influential. As a result, the viewer may view a video in the right-eye frame with less influential afterglow. Thereafter, the second synchronizing signal 903 is transmitted again before the left-eye optical filter 241 is opened, so that the blind condition, during which both of the left-eye and right-eye optical filters 241, 242 are closed, is created.

Referring back to FIG. 7, the sections (D) and (E) in FIG. 7 show changes in transmitted light amount which result from the aforementioned control. The section (D) in FIG. 7 shows the transmitted light amount through the left-eye optical filter 241 of the optical filter section 224 of the video viewing glasses 120, which is operated in response to the synchronizing signal generated by the synchronizing signal generator 304. The section (E) in FIG. 7 shows the transmitted light amount through the right-eye optical filter 242 of the optical filter section 224 of the video viewing glasses 120, which is operated in response to the synchronizing signal generated by the synchronizing signal generator 304. In the examples shown in the sections (D) and (E) in FIG. 7, the optical filter section 224 of the video viewing glasses 120 is controlled to close in synchronism with a period from when the first synchronizing signal 701 is generated to when the second synchronizing signal 702 is generated, and a period from when the second synchronizing signal 703 is generated to when the first synchronizing signal 704 is generated. Therefore it becomes likely that there are decreased light amounts, which is transmitted to both eyes, while the afterglow is largely influential. Thus, the afterglow becomes less influential on the video view.

The synchronization between the blind period, during which the left-eye and the right-eye optical filters 241, 242 of the video viewing glasses 120 are closed, and a period, during which the switching operation between left-eye and right-eye videos on the video displayer 303 of the video display apparatus 100 makes the afterglow influential, allows a viewer to view a video under less influential afterglow. Therefore, the viewer may view a stereoscopic video under a preferable condition.

The configuration allowing the viewer to view a stereoscopic video becomes simplified because the synchronizing control between the start/end timings of left-eye and right-eye video frames displayed by the video display apparatus 100 and opening/closing timings of the left-eye and/or right-eye optical filters 241, 242 of the optical filter section 224 of the video viewing glasses 120 is effected by means of solely two kinds of synchronizing signals.

The synchronizing signal 701, 703 for closing the optical filter section 224 allows the viewer to selectively view a video part, which is free from the influence of the afterglow, in a frame displayed on the video displayer 303, so that the viewer may clearly view the video.

A synchronizing signal is generated in synchronism with timings of starting and ending a frame according to the aforementioned method in the context of the present embodiment. In the control to open/close the optical filter section 224, for example, the start timing of a frame may be defined as a point of time at which an actual light emission indicated by the graphical curve 711 becomes no less than a predetermined light emission amount after light emission is performed in each of the sub-fields to display a video on the video displayer 303. The end timing of a frame may be defined as a point of time at which the afterglow of the video displayed on the video displayer 303 becomes no more than a predetermined light emission amount. Under the aforementioned control, the synchronizing signal generator 304 may generate a synchronizing signal for starting view (increasing the transmitted light amount) if the video displayed on the video displayer 303 satisfies a predetermined quality (image quality). The synchronizing signal generator 304 may generate a synchronizing signal for ending the view (decreasing the transmitted light amount) unless the video displayed on the video displayer 303 satisfies the predetermined quality (image quality). Thus, the synchronizing signal generator 304 may generate a synchronizing signal in response to the quality (image quality) of a video.

Figure 10:
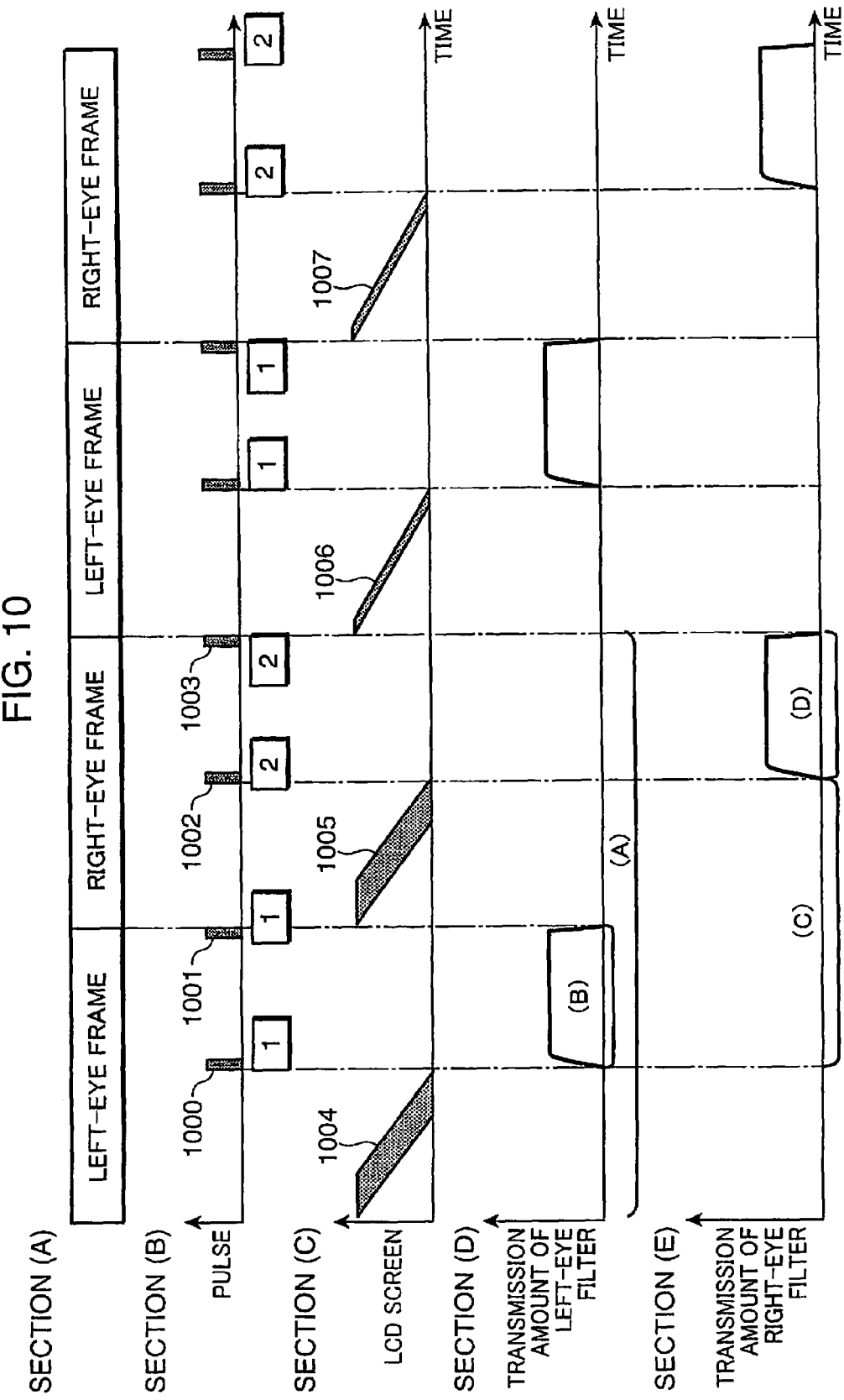
FIG. 10 is a schematic view showing a relationship between generation of a synchronizing signal and control for an optical filter under a condition that an LCD is used as the video displayer shown in FIG. 3.

FIG. 10 exemplifies generation of synchronizing signals by an LCD, which is used as the video displayer 303. The section (A) in FIG. 10 shows a video system of the video displayer 303. Like the PDP exemplified in the context of FIG. 9 as the video displayer 303, in this example, left-eye and right-eye frames are alternately displayed. The section (B) in FIG. 10 is a graph exemplifying synchronizing signals (pulses) generated by the synchronizing signal generator 304 of the LCD, which is used as the video displayer 303.

The section (C) in FIG. 10 exemplifies a video displayed on the LCD (i.e. the video displayer 303). The video displayer 303, which is an LCD, successively scans a video plane along scanning lines, which is a difference in display method from the PDP. Areas 1004, 1005 in the section (C) in FIG. 10 indicate portions where a video is scanned. Video portions in a frame before and after the scanning operation coexist in a portion where a video is scanned. Accordingly, a video in the course of the display change is displayed on the video plane of the video displayer 303 during the scanning operation. Thus the viewer may view the video including a disordered image or a blurred image.

If an LCD is used as the video displayer 303, the synchronizing signal generator 304 generates a synchronizing signal as shown in the section (B) in FIG. 10. Specifically, the synchronizing signal generator 304 generates a synchronizing signal to simultaneously decrease the transmitted light amounts through the left-eye and the right-eye optical filters of the optical filter section 224 of the video viewing glasses 120 while the video is scanned (e.g. the period corresponding to the area 1004). Specifically, if the video shown in the section (C) in FIG. 10 is scanned, the synchronizing signal generator 304 generates a synchronizing signal 1000 to increase the transmitted light amount through the left-eye optical filter 241 after the end of scanning the area 1004 in the left-eye frame, and then generates a synchronizing signal 1001 to decrease the transmitted light amount through the left-eye optical filter 241 before the beginning of scanning the right-eye frame succeeding the left-eye frame. Like the control for the left-eye frame, the synchronizing signal generator 304 generates a synchronizing signal 1002 to increase the transmitted light amount through the right-eye optical filter 242 after the end of scanning the right-eye frame, and then generates a synchronizing signal 1003 to decrease the transmitted light amount through the right-eye optical filter 242 before the beginning of scanning the left-eye frame succeeding the right-eye frame. The synchronizing signals generated by the synchronizing signal generator 304 are transmitted from the synchronizing signal transmitter 306 at the timing correlated to the aforementioned control operation for the video displayer 303.

The sections (D) and (E) in FIG. 10 exemplifies an operation control for the optical filter section 224 of the video viewing glasses 120, which receives the synchronizing signals shown in the section (B) in FIG. 10 from the synchronizing signal generator 304, the synchronizing signal transmitter 306 and alike of the video display apparatus 100. The optical filter controller 405 in the video viewing glasses 120 controls the optical filter section 224 in response to the synchronizing signals received from the video display apparatus 100. The optical filter controller 405 of the video viewing glasses 120 controls the left-eye and right-eye optical filters 241, 242 in synchronism with the synchronizing signals 1000, 1002 representing the start of the frames, respectively, to increase/decrease the transmitted light amounts. In the example shown in the sections (D) and (E) in FIG. 10, the transmitted light amount through the left-eye optical filter 241 is increased in correspondence to the synchronizing signal 1000 representing a view start of the left-eye frame. Thereafter, the transmitted light amount through the left-eye optical filter 241 is decreased in correspondence to the synchronizing signal 1001 representing a view end of the left-eye frame. Subsequently, like the control on the left-eye frame, the transmitted light amount through the right-eye optical filter 242 is increased and then decreased in correspondence to the synchronizing signals 1002, 1003, which represent view start and view end of the right-eye frame, respectively. The optical filter controller 405 controls the optical filter section 224 to open the left-eye optical filter 241 in correspondence to the synchronizing signal 1000 and close the left-eye optical filter 241 in response to the synchronizing signal 1001. Like the control on the left-eye optical filter 241, the optical filter controller 405 controls the optical filter section 224 to open the right-eye optical filter 242 in response to the synchronizing signal 1002 and close the right-eye optical filter 242 in response to the synchronizing signal 1003.

In the embodiment shown in FIG. 10, the synchronizing signal generator 304 generates the synchronizing signals 1000, 1002 once the corresponding frames are completely scanned. The synchronizing signal generator 304 generates the synchronizing signals 1001, 1003 before the beginning of scanning the succeeding frames, respectively. The optical filter controller 224 controls the optical filter section 405 in synchronism with the synchronizing signals 1000, 1001, 1002 and 1003. Therefore, the optical filter controller 405 may increase/decrease the transmitted light amounts to both eyes in synchronism with a video displayed on the video displayer 303 of the video display apparatus 100. In particular, the optical filter controller 405 controls the optical filter section 224 to close both of the left-eye and the right-eye optical filters while a video is scanned. Therefore it becomes less likely that the viewer views an undesirable video such as a disordered image or a blurred image on the video displayer 303. Thus, the viewer may view a quality video.

As described above, even if an LCD is used as the video displayer 303, the synchronizing control between display operation of the video displayer 303 of the video display apparatus 100 and the operation of the optical filter section 224 of the video viewing glasses 120 is achieved, so that the viewer may view a clear stereoscopic video by means of the LCD display.

The synchronizing control by means of solely two kinds of synchronizing signals between left-eye/right-eye video display on the video display apparatus 100 and the optical filter section 224 of the video viewing glasses 120 enables to simplify a configuration with which the viewer views a stereoscopic video.

If an LCD is used as the video displayer 303, scanning speed for overwriting a video may go up as a temperature of liquid crystal elements increases. Therefore the generation timing of a synchronizing signal representing a view start of the video frame may be determined on the basis of a required time for a scanning operation by a dynamic calculation with a detected temperature of the liquid crystal elements by a temperature sensor. In the section (C) in FIG. 10, the scanning areas 1006, 1007 of a video mean a shortened scanning time because of a higher response speed resulting from the increase in temperature of the liquid crystal elements. Therefore the synchronizing signal generator 304 speeds up the generation timing of the synchronizing signal representing the view start of the video (see the section (B) in FIG. 10).

The temperature of liquid crystal elements may be directly detected with a temperature sensor. Alternatively the temperature of the liquid crystal element may be indirectly detected by means of logical calculation for the temperature of the liquid crystal elements, for example, on the basis of an operation time of a backlight device which may affect the temperature of the liquid crystal elements. In other words, the synchronizing signal generator 304 may dynamically determine the generation timing of a synchronizing signal to notify the view start of the video on the basis of temperature information calculated by any method.

Preferably, the backlight device of the LCD is turned off or is dimly lit while the LCD (i.e. the video displayer 303) overwrites a video (scans a video). Therefore a decreased amount of light is irradiated from the display screen of the LCD. Thus, it is less likely that the viewer may view a video in the course of the scanning operation. Thus the viewer may view a quality stereoscopic video.

Figure 11:
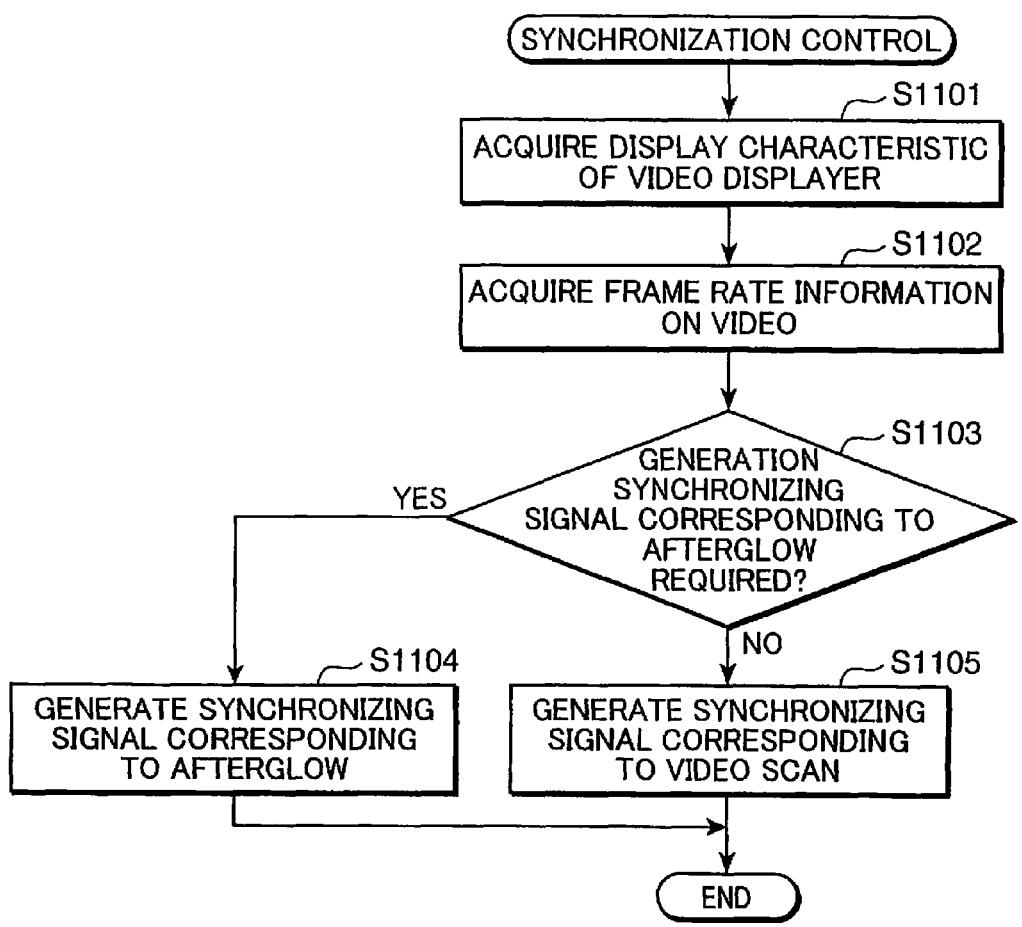
FIG. 11 is a flowchart for generating a synchronizing signal by the synchronizing signal generator shown in FIG. 3.

FIG. 11 is a flowchart showing control to generate a synchronizing signal by the video display apparatus 100 on the basis of display characteristics of the video displayer 303.

In Step 1101 (S1101), the synchronizing signal generator 304 acquires display characteristics of the video displayer 303. For example, in the memory 204, the video display apparatus 100 stores in advance information about display characteristics of the video displayer 303, information indicating that the display system is of PDP or LCD, information about afterglow, and information about scanning operation. For example, the synchronizing signal generator 304 acquires the information about the display characteristics of the video displayer 303, which is stored in the memory 204.

If a PDP is used as the video displayer 303 in a certain embodiment, the synchronizing signal generator 304 acquires the information about afterglow characteristics inherent to the PDP in use. If an LCD is used as the video displayer 303, for example, the synchronizing signal 304 acquires the information about a time required for the scanning operation.

In Step 1102 (S1102), the synchronizing signal generator 304 acquires a frame rate of a displayed video. The frame rate of the video is available from video information decoded by the video decoder 300 or information stored in the L/R signal separator 301 or the memory 204.

In Step 1103 (S1103), the synchronizing signal generator 304 determines a method for generating a synchronizing signal (generating a synchronizing signal in correspondence to afterglow or video scanning) on the basis of the characteristics of the video displayer 303 acquired in S1101. In the aforementioned embodiment, it is determined whether the synchronizing signal generator 304 generates a synchronizing signal in correspondence to afterglow or video scanning. For instance, if a signal transmitted to the synchronizing signal generator 304 is generated by a PDP used as the video displayer 303, it is determined that the synchronizing signal generator 304 generates and transmits the synchronizing signals 901, 903 (see FIG. 9) in correspondence to ends of left-eye and right-eye video frames, respectively. If a signal transmitted to the synchronizing signal generator 304 is generated by an LCD used as the video displayer 303, it is determined that the synchronizing signal generator 304 generates and transmits the synchronizing signals 1000, 1002 in correspondence to scanning of left-eye and right-eye video frames, respectively.

If the synchronizing signal generator 304 determines that the synchronizing signals 901, 903 have to be transmitted in correspondence to the ends of left-eye and right-eye video frames (in correspondence to the afterglow characteristics), respectively, Step 1104 is executed. In Step 1104 (S1104), the synchronizing signal generator 304 generates the synchronizing signals 901, 903 at the ends of the video frames, respectively, according to the determination in S1103. In this case, for example, the synchronizing signal generator 304 calculates generation timings of the synchronizing signals 901, 903 on the basis of the afterglow characteristics of the video displayer 303, as aforementioned. The synchronization signal generator 304 then generates the synchronizing signals 901, 903 on the basis of the calculated timings.

If the synchronizing signal generator 304 determines that the synchronizing signals 1000, 1002 have to be transmitted in correspondence to the scan operation of left-eye video and right-eye frames (in correspondence to video scan), respectively, Step 1105 is executed. In Step 1105 (S1105), the synchronizing signal generator 304 generates the synchronizing signals 1000, 1002 at the ends of scanning the video frames, respectively.

As described above, the video display apparatus 100 generates and transmits the synchronizing signals on the basis of the display characteristics of the video displayer 303. The video viewing glasses 120 controls the optical filter section 224 on the basis of the synchronizing signals from the video display apparatus 100, so that the viewer views a clear video.

The left-eye and right-eye frames may have identical video characteristics to each other. However, the embodiment is not limited to this. For instance, if the left-eye and right-eye frames are different in video characteristics from each other, the synchronizing signal generator 304 may generate synchronizing signals, which are different in waveform from each other, in the left-eye and right-eye frames on the basis of the corresponding video characteristics. Accordingly the optical filter controller 405 differently controls the left-eye and right eye optical filters 241, 242 in response to the synchronizing signals which are different in waveform from each other. In this case, like the embodiment described in the context of the sections (D) and (E) in FIG. 7, the synchronizing signals 700, 701 for the left-eye frame, and the synchronizing signals 702, 703 for the right-eye frame are independently generated, respectively.

In this embodiment, the afterglow characteristics (characteristics that the video in the preceding frame is viewed after the video in the preceding frame is switched over to the video in the succeeding frame) and the characteristics about the scanning operation to switch video frames are exemplified as the display characteristics of the display section. The invention is not limited to this. For instance, the control to generate a synchronizing signal may depend on other display characteristics (e.g. response characteristics of a light emitter) of the display section. Any method depending on display characteristics of the video displayer 303 may be applied to generate and control synchronizing signals according to the invention.

In this embodiment, two kinds of synchronizing signals are exemplified. One of the two kinds of synchronizing signals is used for control operation to open an optical filter for increasing the light amount whereas the other one of the two kinds of synchronizing signals is used for a control operation to close an optical filter for decreasing the light amount. These synchronizing signals may be used to notify a display start and a display end of a video frame, respectively. As described above, the optical filter controller 405 of the video viewing glasses 120 may control the left-eye and right-eye optical filters 241, 242 of the optical filter section 224 in response to the synchronizing signals indicating the display start and the display end of the frame.

<3. Synchronizing Method with Internal Synchronization>

In the aforementioned embodiment, the optical filter controller 405 may read the information stored in the synchronizing information storage 403 to control the optical filter section 224 on the basis of the read information. In this case, it is necessary to transmit all the synchronizing signals from the video display apparatus 100 to the video viewing glasses 120 consistently in response to the switching operation of video frames. Further, it is desirable for the video viewing glasses 120 to receive all the transmitted synchronizing signals. However, there is a case that all the signals are not successfully transmitted or received. For instance, if a remote controller (remote controlling device) (not shown) as an accessory part of the video display apparatus 100 transmits data (data for turning on/off the power source of the video display apparatus 100, or data for causing the video display apparatus 100 to perform other predetermined operation) to the video display apparatus 100 as infrared light, the infrared light from the remote controller may interfere with the infrared light used for communication of a synchronizing signal between the video display apparatus 100 and the video viewing glasses 120, so that the video viewing glasses 120 may fail to appropriately receive the synchronizing signal.

Figure 12:
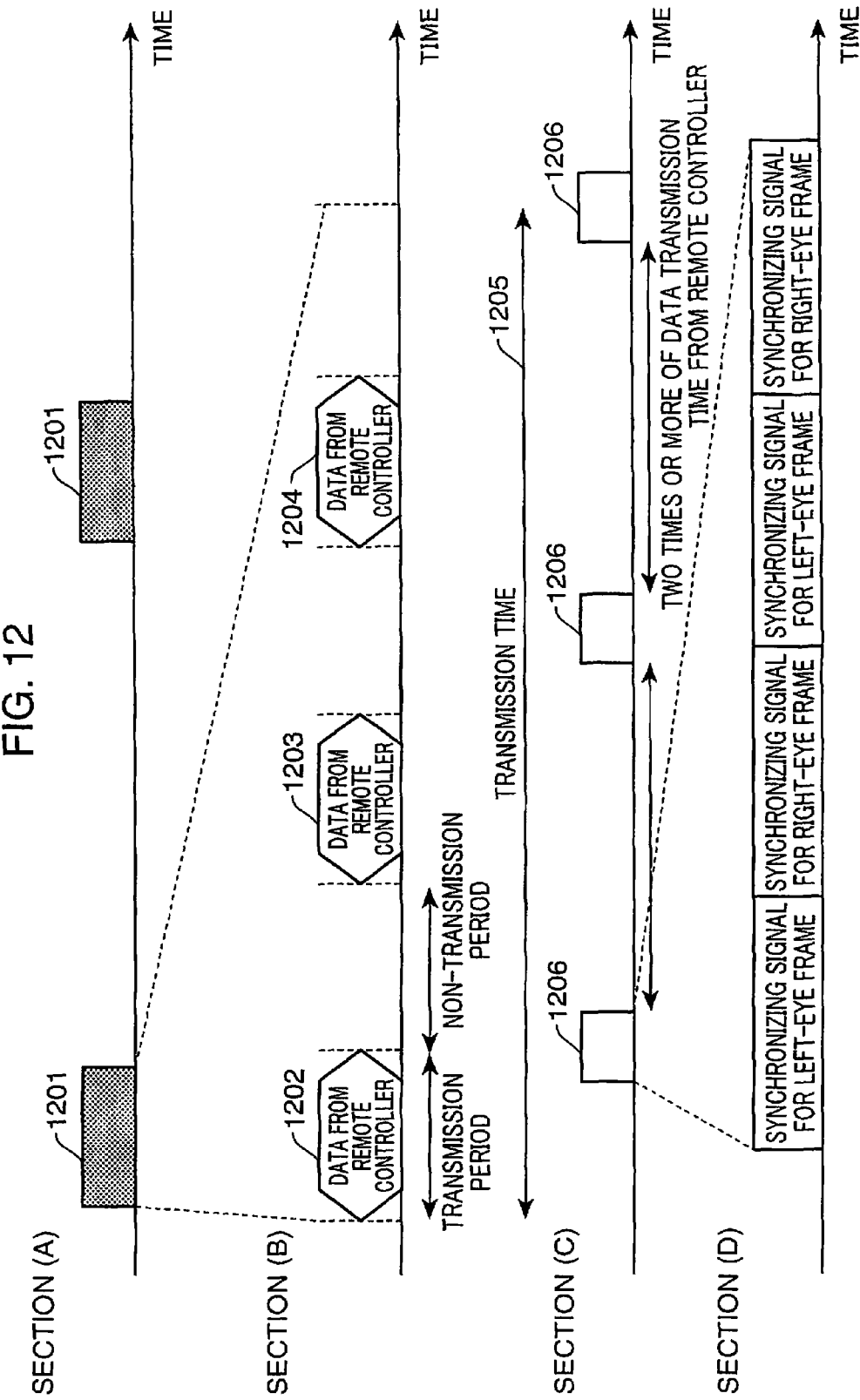
FIG. 12 is a schematic view showing control on transmission interval among synchronizing signal groups.

FIG. 12 is a schematic view showing data transmission from a remote controller. A transmission period 1201 shown in the section (A) in FIG. 12 means a period during which data are transmitted from the remote controller to the video display apparatus 100. The section (B) in FIG. 12 shows operation in the transmission period 1201. In transmitting certain data, the remote controller transmits the same data several times. In the section (B) in FIG. 12, the remote controller transmits the same data three times during the transmission period 1201, in other words, transmits data 1202, 1203 and 1204 during the transmission period 1201. The data transmission from the remote controller includes a predetermined non-transmission period between transmissions of some data and the succeeding data. Accordingly, for example, the video display apparatus 100 may perform processes to identify a boundary between the preceding and succeeding data.

If the data transmission period 1201 from the remote controller overlaps with a transmission timing of a synchronizing signal from the video display apparatus 100 to the video viewing glasses 120, the video viewing glasses 120 may fail to appropriately receive the synchronizing signal. In this embodiment, the transmission timing of a synchronizing signal from the video display apparatus 100 to the video viewing glasses 120 is adjusted as follows.

The transmission controller 305 of the video display apparatus 100 has accumulated in advance information about the transmission period 1201 of the remote controller. In the example shown in FIG. 12, the transmission controller 305 holds in advance time information about a transmission time 1205 corresponding to the data transmission period 1201 from the remote controller. The transmission controller 305 controls transmission of a synchronizing signal to the video viewing glasses 120 according to a length of the transmission time 1205.

An exemplary synchronizing signal group 1206 in the section (C) in FIG. 12 includes synchronizing signals generated in correspondence to left-eye and right-eye frames. As depicted in the section (C) in FIG. 12, a predetermined time (transmission suspending period) after transmitting one synchronizing signal group 1206 under the control of the transmission controller 305, the synchronizing signal transmitter 306 transmits a succeeding synchronizing signal group 1206. In the example shown in FIG. 12, an interval (transmission suspending period), which is defined as a period from when transmission of the synchronizing signal group 1206 is completed to when transmission of the succeeding synchronizing signal group 1206 is started, may be no less than twice as long as the data transmission period 1201 from the remote controller. Therefore, it becomes less likely that the data from the remote controller overlaps with data corresponding to a synchronizing signal, as compared with continuous transmission of synchronizing signals.

The synchronizing signal groups 1206 includes several synchronizing signals in synchronism with several consecutive video frames, as shown in the section (D) in FIG. 12. In the example shown in FIG. 12, one synchronizing signal group 1206 includes two synchronizing signals corresponding to two left-eye frames, and two synchronizing signals corresponding to two right-eye frames. For example, the numbers of the synchronizing signals corresponding to left-eye and right-eye video frames included in one synchronizing signal group 1206 are determined on the basis of an amount (degree of definiteness) of information included in external synchronizing signals, which are minimally required for generating internal synchronizing signals by the internal synchronizing signal generator 404 in the video viewing glasses 120.

As the transmission interval of the synchronizing signal groups 1206 becomes longer than the data transmission period from the remote controller, it becomes less likely that there is interaction between the synchronizing signal groups 1206 and data transmitted from the remote controller. The transmission interval of the synchronizing signal groups 1206 depends on the time length required for transmitting one synchronizing signal group 1206, in addition to the amount of the information included in the external synchronizing signals, which are required for generating internal synchronizing signals. If a time required for transmitting one synchronizing signal group 1206 is extremely long, it becomes more likely that there is the overlap with data transmission from the remote controller.

The transmission controller 305 determines the transmission interval of the synchronizing signal groups 1206 based on the aforementioned various information. The transmission controller 305 then controls the synchronizing signal transmitter 306 to transmit the synchronizing signal groups 1206 at the determined transmission interval. During a period from when one synchronizing signal group 1206 is transmitted to when the succeeding synchronizing signal group 1206 is transmitted, the video viewing glasses 120 are controlled in response to an internal synchronizing signal generated by the internal synchronizing signal generator 404.

The video viewing glasses 120 receive the synchronizing signal groups 1206 from the video display apparatus 100 at the predetermined time interval.

The synchronizing signal analyzer 402 analyzes a synchronizing signal, which is received by the external synchronizing signal receiver 400 and detected by the synchronizing signal detector 401. The synchronizing signal analyzer 402 analyzes information about timings (e.g. cycles) for controlling the left-eye and right-eye optical filters 241, 242 of the optical filter section 224, as shown in the sections (D) and (E) in FIG. 7. In the example shown in the sections (D) and (E) in FIG. 7, the synchronizing signal analyzer 402 calculates an interval (A1) for operating the left-eye optical filter 241 corresponding to the left-eye frame, an interval (B1) for opening the left-eye optical filter 241 corresponding to the left-eye frame (increasing the transmitted light amount), an interval (C1) from when the left-eye optical filter 241 corresponding to the left-eye frame is started to open to when the right-eye optical filter 242 corresponding to the right-eye frame is started to open, and an interval (D1) for opening the right-eye optical filter 242 corresponding to the right-eye frame, on the basis of the interval for receiving the synchronizing signals (pulses or a pulse group).

The synchronizing signal analyzer 402 corresponds to a part of programs executed by the CPU 220. For example, the aforementioned calculation processes by the synchronizing signal analyzer 402 may be achieved by causing the CPU 220 to acquire reception times of the synchronizing signals from the clock 220, respectively, and measure a reception interval of the synchronizing signals. The values measured by the CPU 220 may be stored in the synchronizing information storage 403.

The synchronizing signal analyzer 402 may calculate an average value of the reception intervals of the synchronizing signals, which are acquired several times in the synchronizing signal group 1206, to obtain more accurate measurement times of the intervals (A1), (B1), (C1) and (D1), respectively. In this case, as the measurement number of times is increased, the calculated value by the synchronizing signal analyzer 402 becomes more accurate.

If the operations of the optical filters 241, 242 of the optical filter section 224 are determined in advance (e.g. if the operation frequency of the optical filter section 224 is limited to two kinds of frequencies i.e. 120 Hz and 100 Hz), the internal synchronizing signal generator 404 may select a predetermined operation frequency on the basis of the value calculated in the aforementioned manner by the synchronizing signal analyzer 402. In this case, the frequency for operating the optical filter section 224 may be more accurately determined on the basis of the information about the acquired synchronizing signals and the predetermined operation frequency.

The predetermined operation frequency of the optical filter section 224 may be 120 Hz, which is equal to two times of 60 Hz that is an operation frequency of each of left-eye and right-eye frames in the case of NTSC frequency. Likewise, the predetermined operation frequency of the optical filter section 224 may be 100 Hz in the case of PAL frequency. Alternatively the predetermined operation frequency of the optical filter section 224 may be, for example, 144 Hz or 96 Hz in the case of other frequency.

The internal synchronizing signal generator 404 internally generates a synchronizing signal in the video viewing glasses 120 on the basis of the time interval information, which is stored in the synchronizing information storage 403. The time interval information relates to the interval (A1) for starting an operation of the left-eye optical filter 241 corresponding to the left-eye frame, the interval (B1) for opening the left-eye optical filter 241 in correspondence to the left-eye frame (increasing the transmitted light amount), the interval (C1) from when the left-eye optical filter 241 in correspondence to the left-eye frame is started to open to when the right-eye optical filter 242 in correspondence to the right-eye frame is started to open, and the interval (D1) during which the right-eye optical filter 242 in correspondence to the right-eye frame opens. The CPU 220 may generate the synchronizing signal on the basis of information of the clock 222.

The optical filter controller 405 operates the left-eye and right-eye optical filters 241, 242 of the optical filter section 224 in response to the internal synchronizing signals generated by the internal synchronizing signal generator 404.

Even if the video viewing glasses 120 fail to consistently receive the synchronizing signals from the video display apparatus 100, the video viewing glasses 120 may generate an internal synchronizing signal to control the optical filter section 224 in synchronism with the switching operation between left-eye and right-eye videos displayed on the video displayer 303. Thus, the viewer may continuously view a stereoscopic video.

The synchronizing signal group 1206 transmitted from the video display apparatus 100 includes a synchronizing signal, which corresponds to left-eye or right-eye video frame. Preferably, the synchronizing signal analyzer 402 may analyze the synchronizing signal. In this case, the video viewing glasses 120 generate an internal synchronizing signal once the synchronizing signal group 1206 is received. Preferably, the number of synchronizing signals (the number of video frames) included in the synchronizing signal group 1206 is no less than a number of the synchronizing signals required for generating an internal synchronizing signal by the video viewing glasses 120. In other words, preferably, the synchronizing signal generator 304 or the transmission controller 305 may successively transmit at least a number of the synchronizing signals no less than the required number of the synchronizing signals for generating the internal synchronizing signals by the video viewing glasses 120.

If the synchronizing signal analyzer 402 acquires the information about the intervals (A1), (B1), (C1) and (D1), and then newly receives a synchronizing signal from the external device, the synchronizing signal analyzer 402 may calculate intervals (A1), (B1), (C1) and (D1) again to update the previously calculated values to the newly calculated values. As a result of this operation, the video viewing glasses 120 may quickly respond to a change in frame rate of the video display apparatus 100.

If the video viewing glasses 120 fail to receive a synchronizing signal from the video display apparatus 100 for a predetermined time (e.g. if the video viewing glasses 120 fail to receive a synchronizing signal for a time longer than the interval for transmitting one synchronizing signal group 1206), the optical filter controller 405 may control the optical filter section 224 to open both of the left-eye and right-eye optical filters 241, 242. Therefore, the video viewing glasses 120 provide the viewer with at least a video displayed on the video displayer 303 even if the video viewing glasses 120 fail to receive a synchronizing signal.

As described above, the video display apparatus 100 transmits synchronizing signals at a predetermined time interval.

The video viewing glasses 120 generate an internal synchronizing signal in response to the synchronizing signal received from the video display apparatus 100, and drive the optical filter section 224 in response to the internal synchronizing signal. As a result of this operation, even if the video display system 1 fails to transmit or receive a synchronizing signal, a video display on the video display apparatus 100 becomes synchronized with the operation of the optical filter section 224 of the video viewing glasses 120. Therefore, the viewer may continuously view the video.

In this embodiment, the synchronizing signal analyzer 402 measures and analyzes four intervals i.e. the interval (A1) for starting an operation of the optical filter 241 corresponding to the left-eye frame, the interval (B1) for opening the left-eye optical filter 241 corresponding to the left-eye frame (increasing the transmitted light amount), the interval (C1) from when the left-eye optical filter 241 corresponding to the left-eye frame is started to open to when the right-eye optical filter 242 corresponding to the right-eye frame is started to open, and the interval (D1) for opening the right-eye optical filter 242 corresponding to the right-eye frame. The invention is not limited to this. For instance, a time for opening the right-eye optical filter 242 corresponding to the right-eye frame may be measured by means of a time interval from when the left-eye optical filter 241 corresponding to the left-eye frame is closed. Any method for calculating synchronizing information on the basis of received synchronizing signals is applicable to the invention.

In this embodiment, the transmission controller 305 holds in advance the information about the data transmission period 1201 from the remote controller. The invention is not limited to this. For instance, the video display apparatus 100 may be provided with a part (not shown) for the receiving data from the remote controller. The transmission controller 305 may acquire data about a reception time of receiving the data from the remote controller from the part configured to receive data from the remote controller, and then calculate the reception time of the data from the remote controller. The transmission controller 305 may use a predetermined computation formula to calculate the data transmission period 1201 on the basis of the calculated data reception time. In this case, even if an unknown remote controller is used, the video display apparatus 100 may receive data from the remote controller to appropriately adjust the transmission interval of synchronizing signals.

Figure 13:
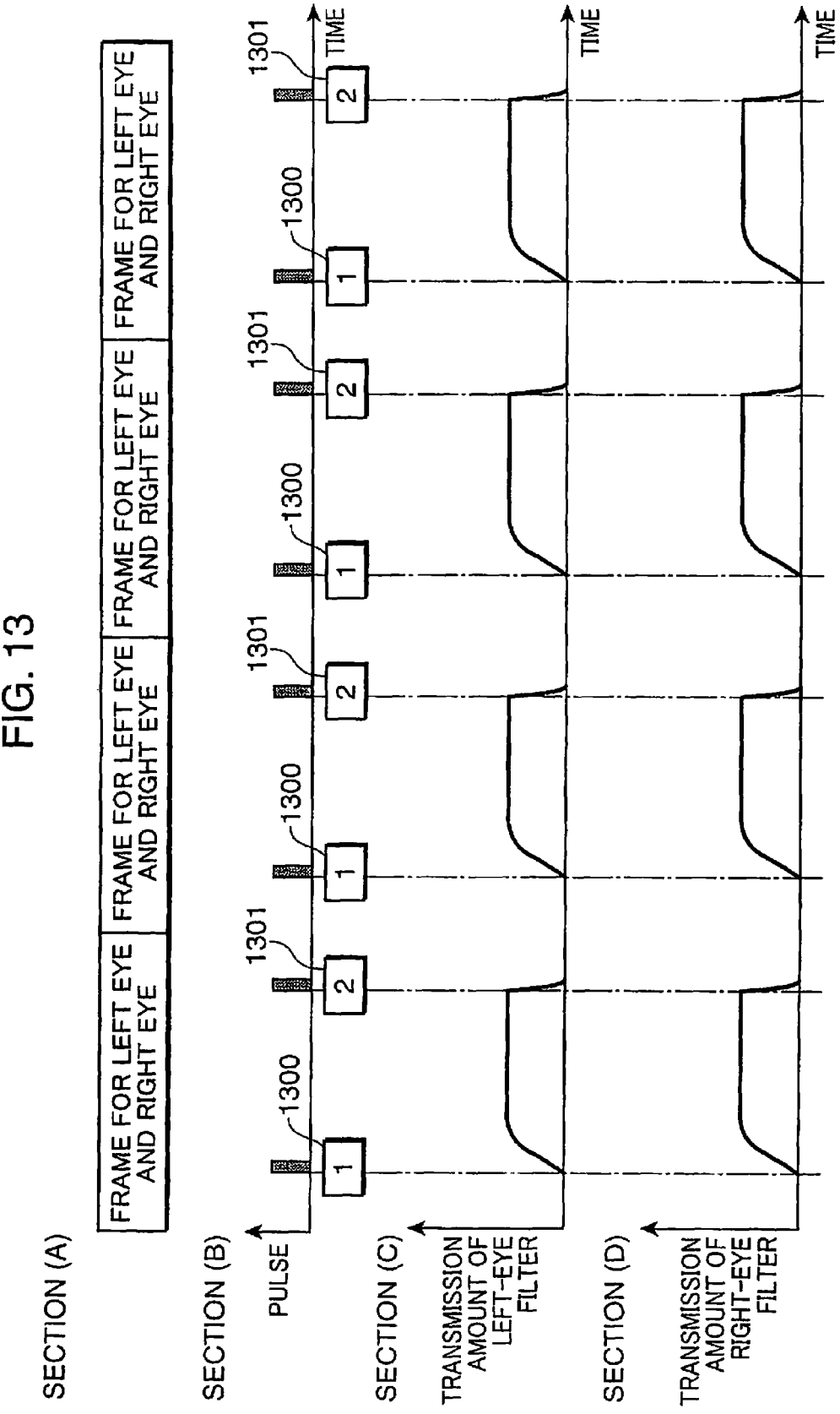
FIG. 13 is a schematic view showing generation of synchronizing signals under a condition that a video displayed on the video displayer shown in FIG. 3 is a moving picture video representing a single content.
Figure 14:
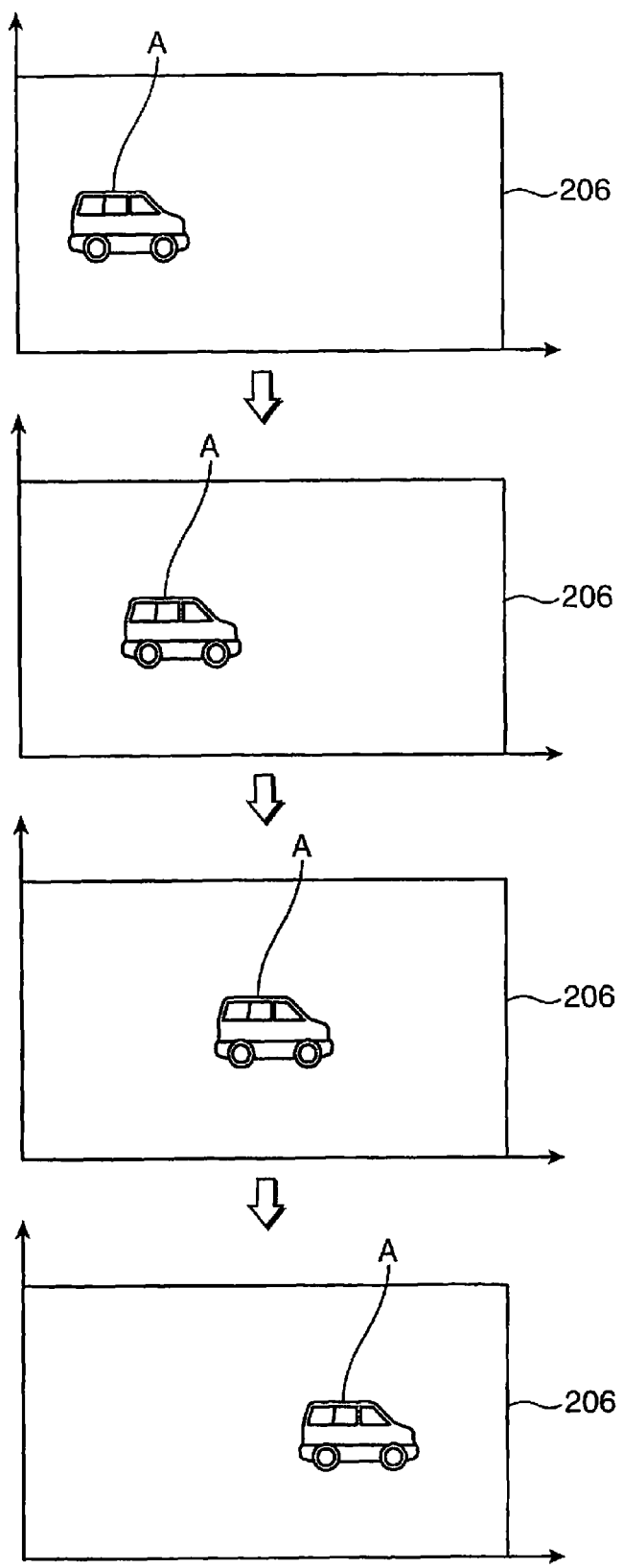
FIG. 14 shows a video in a moving picture frame displayed on the video displayer shown in FIG. 3, where the moving picture frame represents a single content.

FIG. 13 exemplifies control operation to display a video, which is viewed as a two dimensional video on the video displayer 303. FIG. 14 exemplifies a video which is viewed as the two dimensional video.

Each frame shown in the section (A) in FIG. 13 is viewed by both eyes. For example, the frames shown in the section (A) in FIG. 13 may contain a video which is viewed as a two dimensional video, like the video shown in FIG. 14, respectively. As shown in FIG. 14, the frames may be time-sequentially switched one after the other, so that positions of the object "A" displayed in a video in the frames may be changed time-sequentially. In this case, the video depicted in FIGS. 13 and 14 becomes a moving picture video representing identical contents.

If a video is a standard video (a video viewed as a two dimensional video), as depicted in FIGS. 13 and 14, it is not necessary to alternately operate the left-eye and right-eye optical filters 241, 242 of the video viewing glasses 120 described in the context of FIG. 7. The optical filter controller 405 controls the optical filter section 224 so that the transmitted light amounts through the left-eye and right-eye optical filters 241, 242 substantially equal to each other (a difference in transmitted light amount between the left-eye and right-eye optical filters lies within a predetermined range). In the example shown in FIG. 13, the video display apparatus 100 transmits a first synchronizing signal 1300 and a second synchronizing signal 1301 every one frame. In each frame, the first synchronizing signal 1300 serves as a synchronizing signal for increasing the light amount. The first synchronizing signal 1300 is used for controlling to open the left-eye and right-eye optical filters 241, 242. The second synchronizing signal 1301 serves as a synchronizing signal for decreasing the amount of light. The second synchronizing signal 1301 is used for control to close the left-eye and right-eye optical filters 241, 242.

The internal synchronizing method in the context of FIG. 12 may be applicable to the embodiment shown in FIGS. 13 and 14. Further alternatively, the synchronizing signal generator 304 may generate one of the first and second synchronizing signals 1300, 1301, so that the synchronizing signal transmitter 306 may successively transmit the generated synchronizing signals, instead of generating both of the first and second synchronizing signals 1300, 1301. In this case, the first or second synchronizing signal 1300, 1301, which is initially transmitted, serves as a synchronizing signal used for control to open the optical filter section 224. The first or second synchronizing signal 1300, 1301, which is transmitted after the transmitted synchronizing signal, serves as a synchronizing signal used for control to close the optical filter section 224.

(Second Embodiment)

The second embodiment is different from the first embodiment only in a synchronizing signal transmitted from a video display apparatus 100 to video viewing glasses 120. Since other configurations of the second embodiment are substantially the same as the corresponding configurations of the first embodiment, description thereof is omitted herein.

Figure 15:
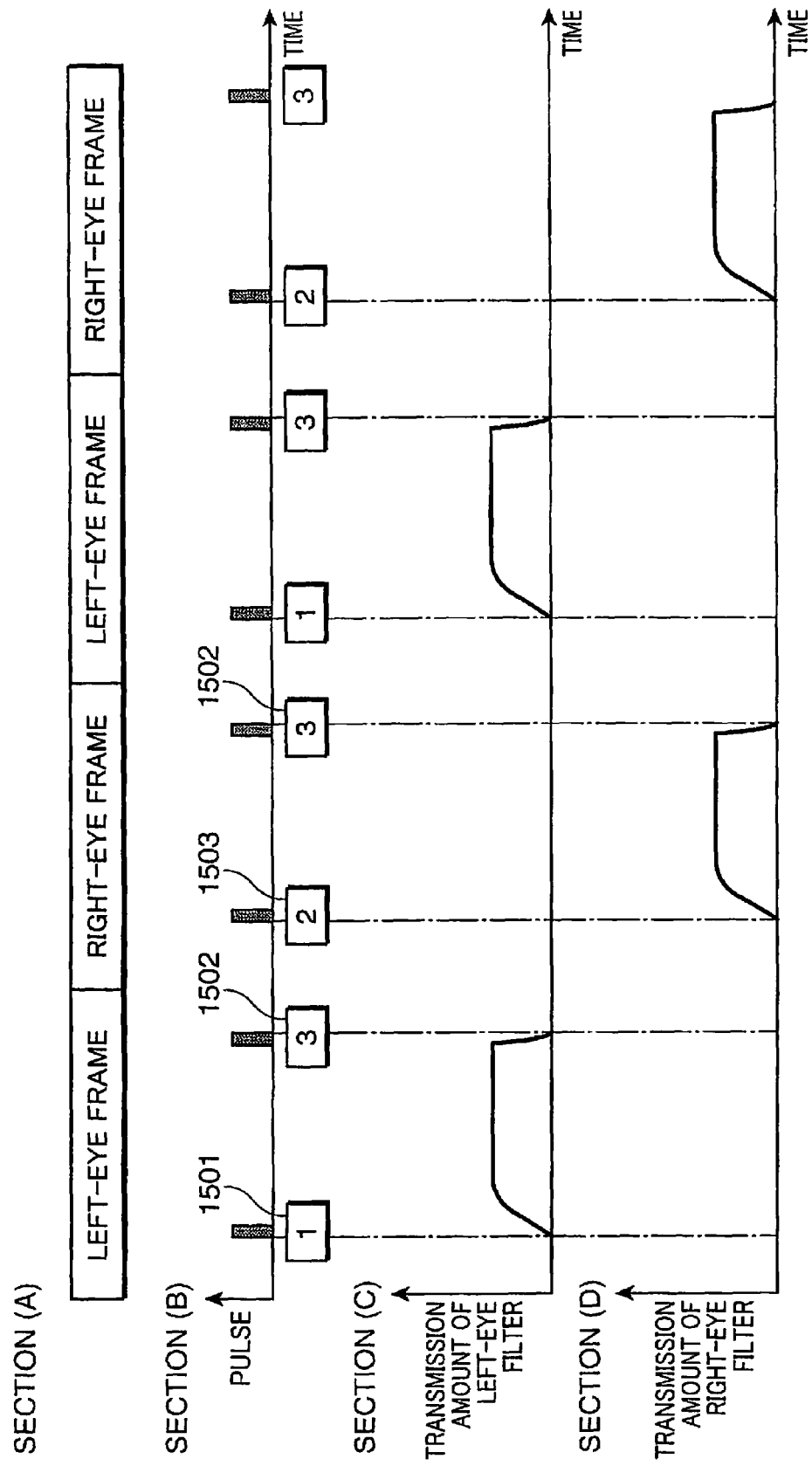
FIG. 15 is a schematic view exemplifying controlled operation of the optical filter section under transmission of three different kinds of synchronizing signals in waveform from each other by the transmission controller shown in FIG. 3.

FIG. 15 exemplifies control by means of three kinds of synchronizing signals different from each other. A video frame shown in the section (A) in FIG. 15 is a stereoscopic video which is perceived as a stereoscopic video (see FIGS. 5 and 6). The example shown in FIG. 15 is different from the first embodiment only in synchronizing signal shown in the section (B) in FIG. 15. The section (B) in FIG. 15 shows three kinds of synchronizing signals 1501, 1502 and 1503, which are different in waveform from each other. Like the pulse waveform described in the context of FIG. 8, the synchronizing signal analyzer 402 discriminates the kind of the synchronizing signal on the basis of a difference in pulse number or pulse width among the three kinds of the synchronizing signals. For instance, the synchronizing signal analyzer 402 identifies a signal having two pulses in a predetermined time as a synchronizing signal to open the left-eye optical filter 241; a signal having four pulses in the predetermined time as a synchronizing signal to open the right-eye optical filter 242; and a signal having three pulses in the predetermined time as a synchronizing signal to close the left-eye and right-eye optical filters 241, 242 if the left-eye and right-eye optical filters 241, 242 are in an opened orientation.

A synchronizing signal generator 304 generates the first synchronizing signal 1501 at the beginning of displaying a video in a left-eye frame, and then transmits the first synchronizing signal 1501 from a synchronizing signal transmitter 306 to the video viewing glasses 120. If afterglow in the left-eye frame becomes no more than a predetermined level after the end of displaying the video in the left-eye frame, the synchronizing signal generator 304 generates the third synchronizing signal 1502, which is then transmitted from the synchronizing signal transmitter 306 to the video viewing glasses 120. An optical filter controller 405 of the video viewing glasses 120 controls opening/closing operation of the left-eye and right-eye optical filters 241, 242 of the optical filter section 224 in response to the transmitted synchronizing signals 1501, 1502.

Like the control for the left-eye frame, the synchronizing signal generator 304 generates the second synchronizing signal 1503 if display of a video in a right-eye frame is started. If the afterglow in the right-eye frame becomes no more than the predetermined level after the end of video display in the right-eye frame, the synchronizing signal generator 304 generates the third synchronizing signal 1502, which is then transmitted from the synchronizing signal transmitter 306 to the video viewing glasses 120. The optical filter controller 405 of the video viewing glasses 120 controls opening/closing operations of the left-eye and right-eye optical filters 241, 242 of the optical filter section 224 in response to the transmitted synchronizing signals 1503, 1502.

In this embodiment, the synchronization between the video display apparatus 100 and the video viewing glasses 120 is retained by means of the three kinds of the synchronizing signals 1501, 1502 and 1503. In particular, a common synchronizing signal (in the aforementioned example, the third synchronizing signal 1502) is used to control closing operation of the left-eye and right eye optical filters 241, 242 of the optical filter section 224 (decreasing the transmitted light amounts through the left-eye and right-eye optical filters 241, 242). Like the first embodiment, the synchronizing signal generator 304 creates a blind condition under which the left-eye and right-eye optical filters 241, 242 of the optical filter section 224 are simultaneously closed to synchronize the blind period with a period during which the switching operation between the left-eye and right-eye frames on the video displayer 303 is performed. As a result of the control operation, the viewer may view a clear video.

The video viewing glasses 120 may be facilitated to identify whether the optical filter section 224 is opened or closed when the video viewing glasses 120 receives a synchronizing signal for the first time because the synchronizing signal used for control to open the optical filter section 224 is different in waveform from the synchronizing signal used for control to close the optical filter section 224.

Figure 16:
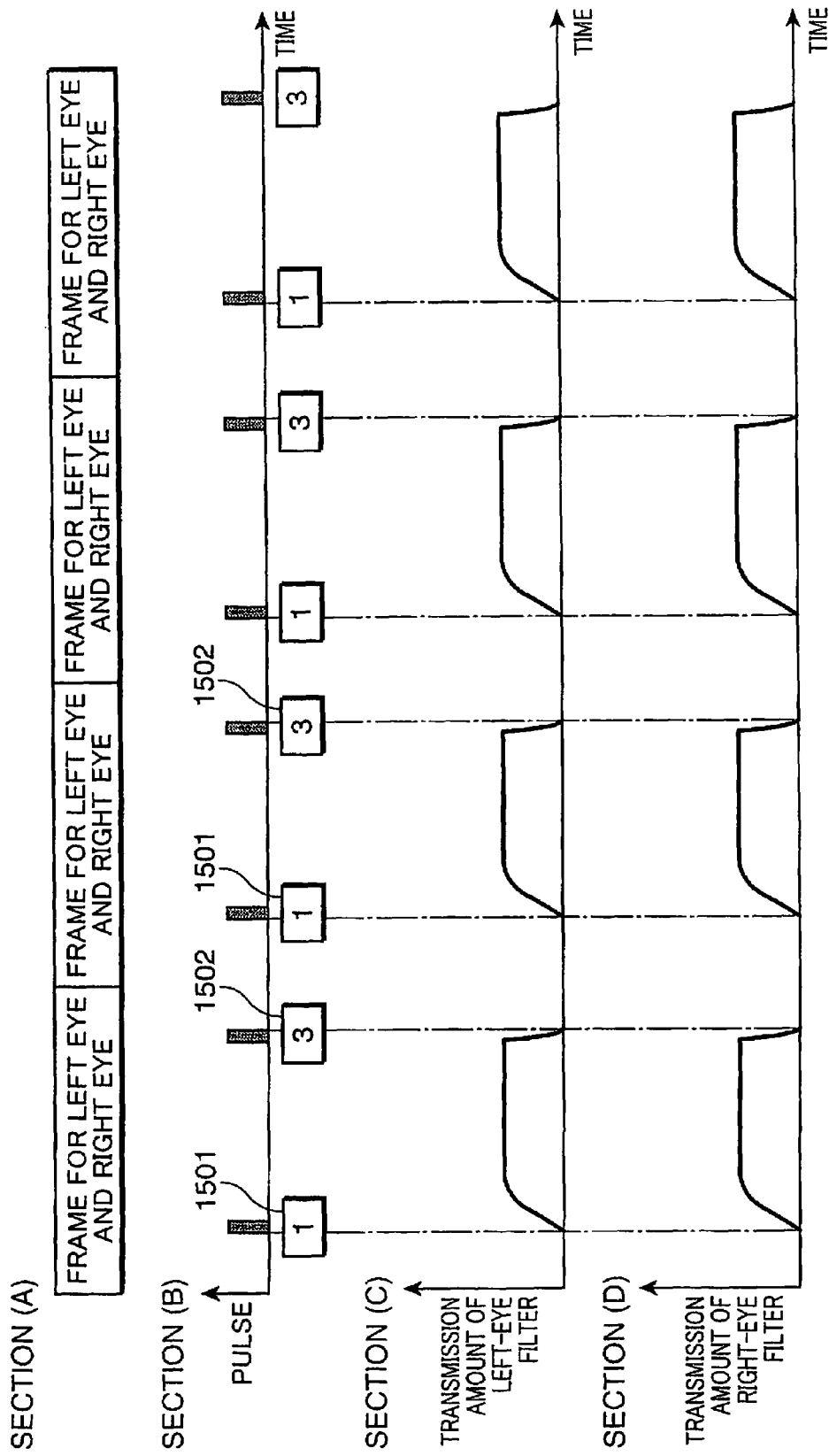
FIG. 16 is a schematic view exemplifying control operation to display a two-dimensional video on the video displayer shown in FIG. 3.

FIG. 16 exemplifies control for viewing a two-dimensional display image described in the context of FIGS. 13 and 14 by means of different synchronizing signals in waveform used for control to open and close the optical filter section 224, as described in context of FIG. 15. In the control exemplified in FIG. 16, the first and third synchronizing signals 1501, 1502 shown in FIG. 15 are used. The first synchronizing signal 1501 serves as a synchronizing signal which is used for control to open both of the left-eye and right-eye optical filters 241, 242 to increase the transmitted light amount. Like the example described in the context of FIG. 15, the third synchronizing signal 1502 serves as a synchronizing signal which is used for control to close both of the left-eye and right-eye optical filters 241, 242 to decrease the transmitted light amount. As shown in FIG. 16, the third synchronizing signal 1502 is transmitted after the first synchronizing signal 1501 is transmitted while each frame is displayed. Therefore, the left-eye and right-eye optical filters 241, 242 under the control are substantially simultaneously opened and closed in each frame. In the example shown in FIG. 16, the second synchronizing signal 1503 shown in FIG. 15 may be used as a synchronizing signal to increase the transmitted light amount.

Figure 17:
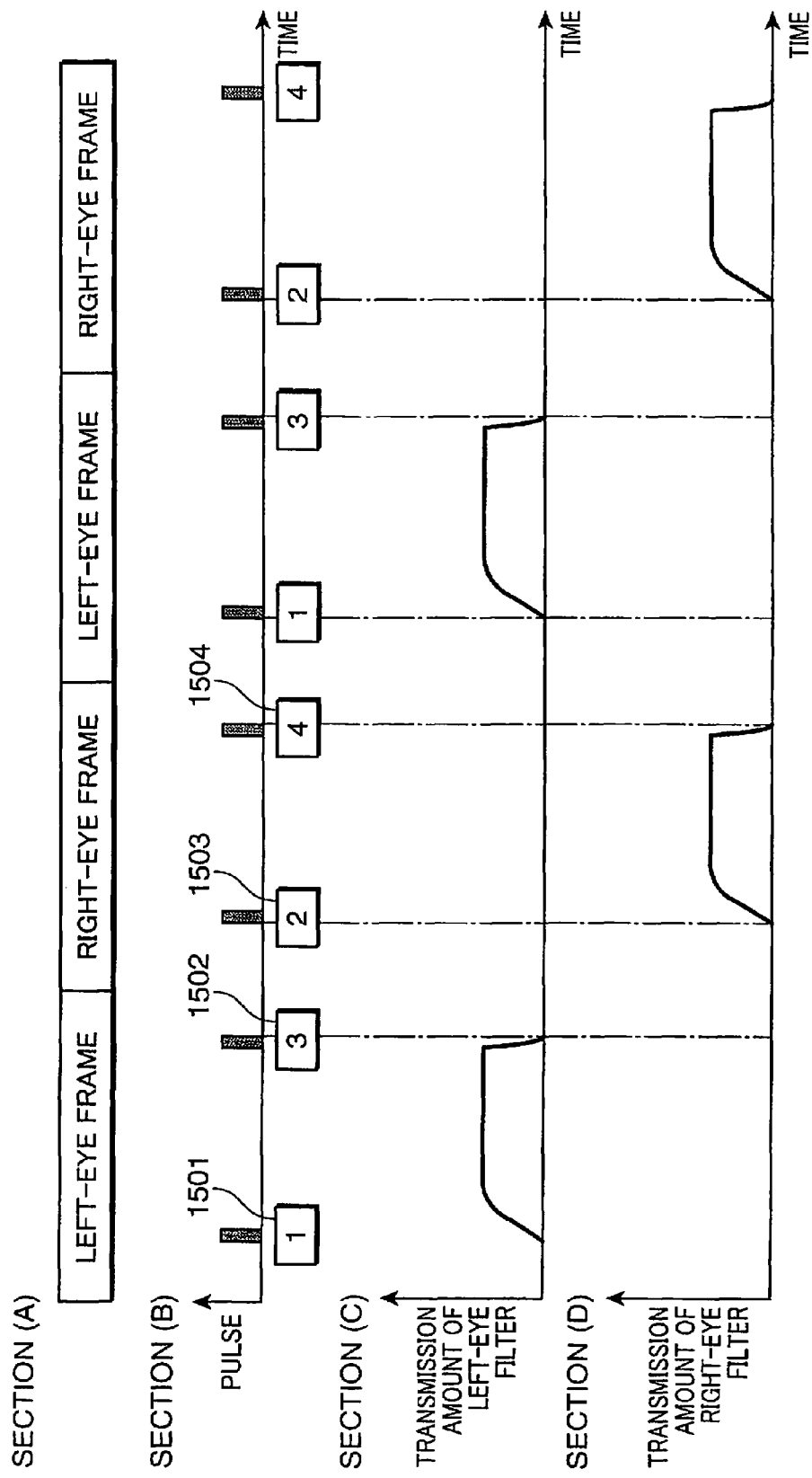
FIG. 17 is a schematic view exemplifying control of the optical filter section under transmission of four different kinds of synchronizing signals in waveform from each other by the transmission controller shown in FIG. 3.

FIG. 17 shows control by means of four kinds of synchronizing signals which are different in waveform from each other. A video frame shown in the section (A) in FIG. 17 is a stereoscopic video which is three-dimensionally perceived (see FIGS. 5 and 6). Like the pulse waveform described in the context of FIG. 8, the synchronizing signal analyzer 402 identifies the kind of the synchronizing signal on the basis of a difference in pulse number or pulse width among four kinds of the synchronizing signals. For instance, the synchronizing signal analyzer 402 may identify a signal having two pulses in a predetermined time as a synchronizing signal 1501 for opening the left-eye optical filter 241; a signal having four pulses in the predetermined time as a synchronizing signal 1503 for opening the right-eye optical filter 242; a signal having three pulses in the predetermined time as a synchronizing signal 1502 for closing the left-eye optical filter 241; and a signal having five pulses in the predetermined time as a synchronizing signal 1504 for closing the right-eye optical filter 242.

As shown in FIG. 17, the video viewing glasses 120 may be synchronized with the video display apparatus 100 by means of the four kinds of the synchronizing signals 1501, 1502, 1503 and 1504. It should be noted that the synchronizing signals shown in FIG. 17 are indicated with the same reference numerals as the synchronizing signals shown in FIGS. 15 and 16 to simplify the comparison with the example described in the context of FIGS. 15 and 16.

In the control shown in FIG. 17, the synchronizing signal generator 304 generates the first synchronizing signal 1501 if a video in a left-eye frame is started to display. The synchronizing signal generator 304 then generates the third synchronizing signal 1502 if afterglow in the left-eye frame becomes no more than a predetermined level after the display end of the video in the left-eye frame.

The synchronizing signal generator 304 generates the synchronizing signal 1503 if a video in a right-eye frame is started to display. The synchronizing signal generator generates the fourth synchronizing signal 1504 if afterglow in the right-eye frame becomes no less than a predetermined level after the display end of the video in the right-eye frame.

It should be understood, like the first embodiment, that generation timings of the synchronizing signals used in this embodiment (the synchronizing signals for opening and closing the optical filter in synchronism with the left-eye and right-eye frames) may be adjusted, for example, on the basis of display characteristics of the video displayer 303.

If a two-dimensional video described in the context of FIG. 16 is viewed, the fourth synchronizing signal 1504 shown in FIG. 17 may be used, instead of the third synchronizing signal 1502 shown in FIG. 16.

(Third Embodiment)

In the first and the second embodiments, the video display apparatus 100 displays a video which the viewer views as a stereoscopic video. In this embodiment, a video display apparatus 100 displays a video for allowing the viewer to view two moving picture videos representing different contents from each other.

Figure 18:
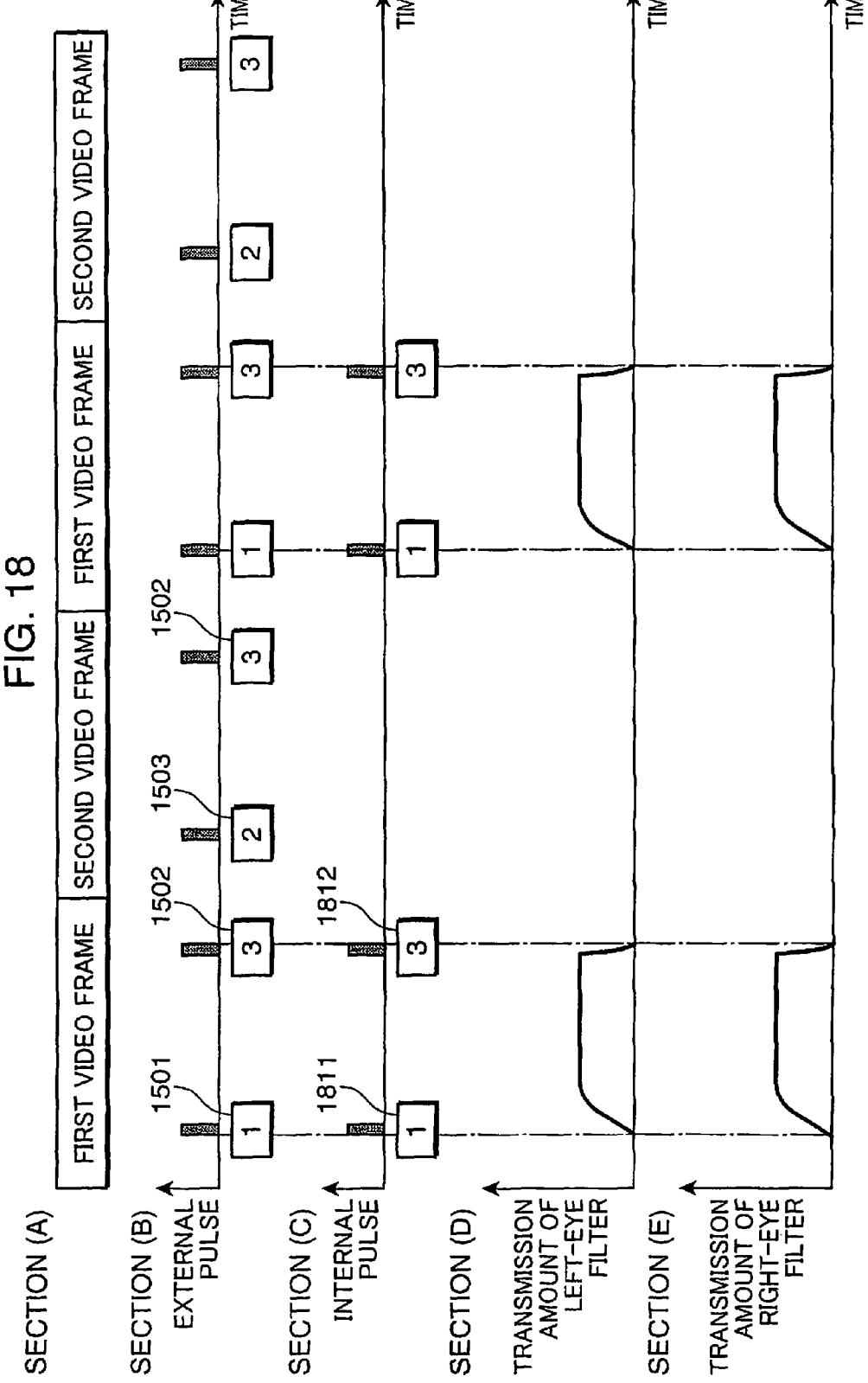
FIG. 18 is a schematic view exemplifying control to allow a viewer to selectively view videos displayed on the video displayer shown in FIG. 3.
Figure 19:
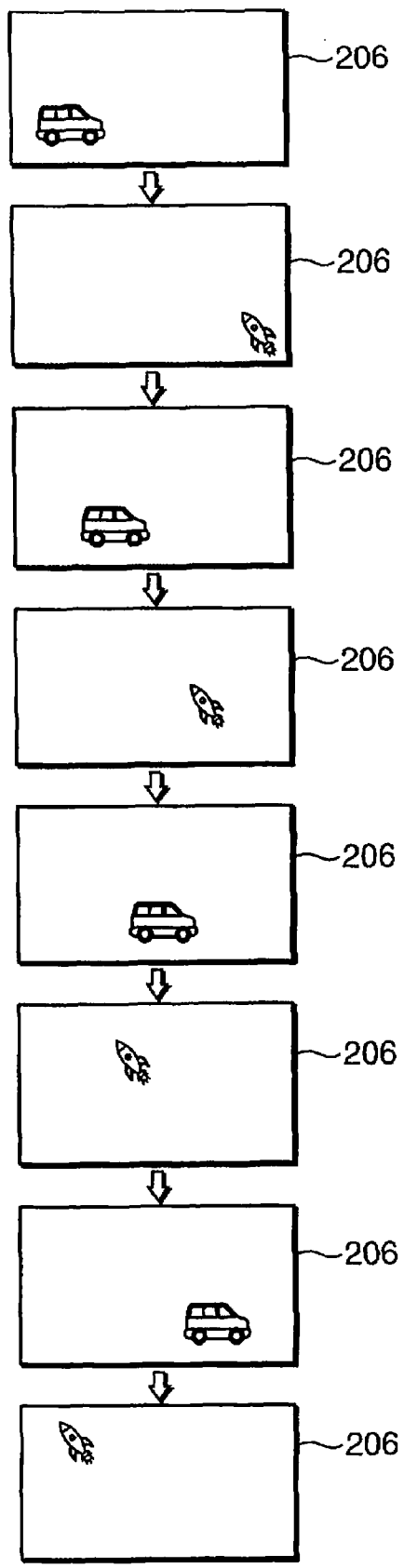
FIG. 19 is a schematic view exemplifying a video displayed on a video display apparatus, which is used in the control shown in FIG. 18.

FIG. 18 shows a control to make the viewer view two moving picture videos representing different contents from each other. FIG. 19 exemplifies videos in first and second video frames shown in the section (A) in FIG. 18. In the section (A) in FIG. 18, the first and second videos displayed on the video displayer 303 of the video display apparatus 100 are switched every one frame. In the control shown in FIG. 18, the synchronizing signals shown in FIG. 18 are indicated with the same reference numerals as those used in FIG. 15 because synchronizing signals transmitted from the video display apparatus 100 are substantially the same as those described in the context of FIG. 15.

The video display apparatus 100 displays a video by switching between the first and second video frames every one frame. During this control, as shown in FIG. 19, videos without correlation to each other in contents are alternately displayed on the display panel 206. The synchronizing signal generator 304 generates synchronizing signals 1501, 1502 and 1503 as shown in the section (B) in FIG. 18 in the similar manner as described in the context of FIG. 15. The synchronizing signal generator 304 generates the first synchronizing signal 1501 if display of a video in the first video frame is started; and the third synchronizing signal 1502 if afterglow in the first video frame becomes no more than a predetermined level after the display end of the first video. The generated first and third synchronizing signals 1501, 1502 are transmitted from the synchronizing signal generator 304 to the external synchronizing signal receiver 400 via the synchronizing signal transmitter 306.

Like the control on the first video frame, the synchronizing signal generator 304 generates the second synchronizing signal 1503 if display of a video in the second video frame is started; and generates the third synchronizing signal 1502 if afterglow in the second video frame becomes no more than a predetermined level after the display end of the second video. The generated second and third synchronizing signals 1503, 1502 are transmitted from the synchronizing signal generator 304 to the external synchronizing signal receiver 400 via the synchronizing signal transmitter 306.

Video viewing glasses 120 are provided with a switch (not shown) so that the viewer may operate the switch to view one of a stereoscopic video, a first video, and a second video. If the switch is operated to select the first video, a synchronizing signal analyzer 402 in the video viewing glasses 120 extracts solely synchronizing signals corresponding to the first video frame (i.e. the first and third synchronizing signals 1501, 1502) out of the received synchronizing signals.

The synchronizing signal analyzer 402 calculates information for generating an internal synchronizing signal on the basis of the extracted first and third synchronizing signals 1501, 1502. The internal synchronizing signal generator 404 generates an internal synchronizing signal in synchronism with the first video frame on the basis of the calculated information, as shown in the section (C) in FIG. 18. The optical filter controller 405 operates the optical filter section 224 in response to the internal synchronizing signal generated by the internal synchronizing signal generator 404.

The optical filter controller 405 controls the optical filter section 224 to open the left-eye and right-eye optical filters 241, 242 for a period corresponding to the first video frame. On the contrary, the optical filter controller 405 controls the optical filter section 224 to close the left-eye and right-eye optical filters 241, 242 while the second video frame is displayed on the video displayer 303.

If the viewer operates the switch of the video viewing glasses 120 to select the second video, the synchronizing signal analyzer 402 in the video viewing glasses 120 extracts solely the second and third synchronizing signals 1503, 1502 corresponding to the second video frame out of the received synchronizing signals.

The synchronizing signal analyzer 402 calculates information for generating an internal synchronizing signal in response to the extracted second and third synchronizing signals 1503, 1502. The internal synchronizing signal generator 404 generates an internal synchronizing signal in synchronism with the second video frame on the basis of the calculated information. The optical filter controller 405 operates the optical filter section 224 in response to the internal synchronizing signal generated by the internal synchronizing signal generator 404.

The optical filter controller 405 controls the optical filter section 224 to open the left-eye and right-eye optical filters 241, 242 for a period corresponding to the second video frame. On the contrary, the optical filter controller 405 controls the optical filter section 224 to close the left-eye and right-eye optical filters 241, 242 while the first video frame is displayed on the video displayer 303. As a result of the control operation, the viewer may selectively view solely the second video frame.

Figure 20:
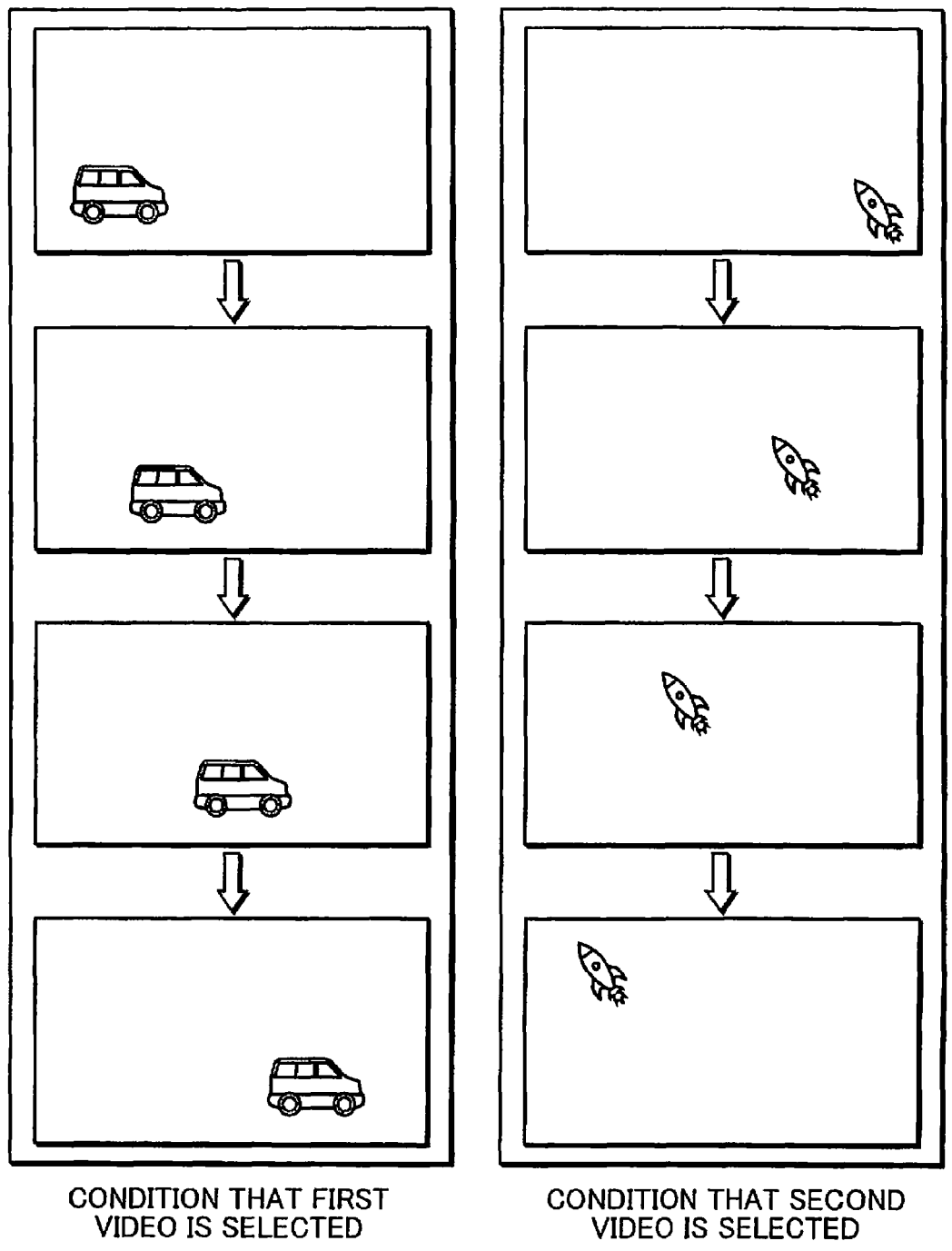
FIG. 20 is a schematic view exemplifying a video viewed by a viewer under the control shown in FIG. 18.

FIG. 20 exemplifies videos viewed by the viewer under the control shown in FIG. 18. As described above, the viewer may view solely one of the first and second videos by means of the control of the optical filter section 224. Accordingly, as shown in FIG. 20, the viewer is provided with a series of moving pictures correlated to each other in contents. If the first video is selected by means of the switch of the video viewing glasses 120, the viewer may view the first video frame. On the other hand, if the viewer operates the switch of the video viewing glasses 120 to select the second video, the viewer may view the second video frame.

Alternatively, the control using two kinds of synchronizing signals described in the context of FIG. 7 may be applied to the control shown in FIG. 18. In this case, for instance, the first synchronizing signal 700, 701 is allocated to the first video frame, and the second synchronizing signal 702, 703 is allocated to the second video frame. The synchronizing signal analyzer 402 extracts one of the first synchronizing signal 700, 701, and the second synchronizing signal 702, 703 in response to the switching operation with the switch of the video viewing glasses 120. The optical filter controller 405 may control the optical filter section 224 to open/close the left-eye and right-eye optical filters 241, 242 in response to the extracted synchronizing signal out of the first synchronizing signal 700, 701, and the second synchronizing signal 702, 703.

Further alternatively, the control using four kinds of synchronizing signals described in the context of FIG. 17 may be applied to the control shown in FIG. 18. In this case, for instance, the first and third synchronizing signals 1501, 1502 are allocated to the first video frame, and the second and fourth synchronizing signals 1503, 1504 are allocated to the second video frame. The synchronizing signal analyzer 402 extracts one of the paired signals constituted of the first and third synchronizing signals 1501, 1502, and the paired signals constituted of the second and fourth synchronizing signals 1503, 1504 in response to the switching operation with the switch of the video viewing glasses 120. The optical filter controller 405 may control the optical filter section 224 to open/close the left-eye and right-eye optical filters 241, 242 in response to the extracted synchronizing signal pair out of the paired signals constituted of the first and third synchronizing signals 1501, 1502 and the paired signals constituted of the second and fourth synchronizing signals 1503, 1504.

Like the first embodiment, the control for the left-eye and right-eye optical filters 241, 242 of the optical filter section on the basis of display characteristics of the video displayer 303 in this embodiment makes the afterglow less influential.

If the viewer use the switch to select view of a stereoscopic video as described in the first and second embodiments, the viewer may view the stereoscopic image under the control of the optical filter section 224 of the video viewing glasses 120 in synchronism with a frame displayed on the video display apparatus 100.

Two different videos viewed by the viewer are exemplified in this embodiment. The invention is not limited to this. The viewer may selectively view three or more different videos with a similar manner as described above.

FIG. 21 exemplifies control of a liquid crystal filter incorporated with liquid crystal elements, which is used as the optical filter section 224. The switching operation between left-eye and right-eye frames is shown in the section (A) of FIG. 21. Like the example shown in the section (A) in FIG. 15, the left-eye and right eye frames are alternately switched in the example shown in the section (A) in FIG. 21. The section (B) in FIG. 21 shows a change in light emission luminance (i.e. afterglow characteristics) of the display panel 206. The section (C) in FIG. 21 shows external synchronizing signals 1502, 1503 transmitted from the synchronizing signal transmitter 306. The synchronizing signals substantially equivalent to the second and third synchronizing signals 1503, 1502 shown in FIG. 15 are used in the section (C) in FIG. 21. The second synchronizing signal 1503 is indicated by a waveform having two pulses whereas the third synchronizing signal 1502 is indicated by a waveform having three pulses.

The sections (D) and (E) in FIG. 21 show control for video viewing glasses 120 equipped with a right-eye optical filter 242 having a standard response speed. If the right-eye optical filter 242 having the standard response speed is used, for instance, the internal synchronizing signal generator 404 generates internal synchronizing signals 2102, 2103 substantially simultaneously with the external synchronizing signal 1502, 1503, respectively, in response to the reception of the external synchronizing signals 1502, 1503 by the external synchronizing signal receiver 400.

The sections (F) and (G) in FIG. 21 show control for video viewing glasses 120 equipped with a right-eye optical filter 242 having a response speed faster than the standard response speed. If the right-eye optical filter 242 having the fast response speed is used, for instance, the internal synchronizing signal generator 404 generates an internal synchronizing signal 2112 at a timing delayed by a predetermined delay time "D1" from the external synchronizing signal 1502, which is used for control to open the right-eye optical filter 242, in response to the reception of the external synchronizing signal 1502 by the external synchronizing signal receiver 400. The delay time "D1" may be a constant value inherent to the right-eye optical filter 242 in use, or may be varied depending on a frame frequency. For example, a value of the delay time "D1" may be determined so that the time when the opening rate of the right-eye optical filter 242 with the fast response speed reaches 50% may substantially correspond to the time when the opening rate of the right-eye filter 242 with the standard response speed reaches 50% after the external synchronizing signal 1502 is received.

Likewise, if the external synchronizing signal receiver 400 receives the external synchronizing signal 1503, the internal synchronizing signal generator 404 generates the internal synchronizing signal 2112 at a timing delayed by a predetermined delay time "D2" from the external synchronizing signal 1503, which is used for control to close the right-eye optical filter 242. Like the aforementioned manner, the delay time "D2" may be a value determined by any method, such as a predetermined inherent constant value, a value depending on a frame frequency or a value determined so that the time when the right-eye optical filter 242 becomes a predetermined condition (for example, 50% of the opening rate), which corresponds to a predetermined condition for the right-eye filter 242 with the standard response speed (for example, 50% of the opening rate). The opening rate at 50% is merely an example. Alternatively, any combination such as combination of 50% and 30% and combination of 80% and 90% may be used. In other words, any value for the opening rate may be applicable to the aforementioned method utilizing the opening rate as a reference. If the value for the opening rate is set to substantially 50%, it becomes less likely that there is image quality deterioration as an adverse effect caused by offset of the operation start timing.

If the right-eye optical filter 242 having the standard response speed is used, the right-eye optical filter 242 is started to open before afterglow in the left-eye frame becomes sufficiently less influential. As a result, an afterglow amount of a video in the left-eye frame, which is perceived by the viewer viewing the video through the right-eye optical filter 242 having the standard response speed, is increased.

If a right-eye optical filter 242 having a fast response speed is used, the right-eye optical filter 242 is started to open after the afterglow in the left-eye frame becomes sufficiently less influential. As a result, the viewer who views the video through the right-eye optical filter 242 having the fast response speed perceives a decreased afterglow amount of a video in the left-eye frame.

(Fourth Embodiment)

Transmission control by the transmission controller to transmit synchronization signals generated by the synchronizing signal generator 304 is described in this embodiment.

FIG. 22 shows a relationship between an internal signal generated by the synchronizing signal generator 304 and a synchronizing signal transmitted by the synchronizing signal transmitter 306. The section (A) in FIG. 22 shows an internal signal generated by the synchronizing signal generator 304 in correspondence to a left-eye frame, the section (B) in FIG. 22 shows an internal signal generated by the synchronizing signal generator 304 in correspondence to a right-eye frame, and the section (C) in FIG. 22 shows a synchronizing signal output from the synchronizing signal transmitter 306.

The synchronizing signal generator 304 generates a synchronizing signal according to the aforementioned methods of the first to third embodiments. In generating a synchronizing signal, the synchronizing signal generator 304 internally generates and manages the signals as shown in the sections (A) and (B) in FIG. 22. The example shown in the section (A) in FIG. 22 indicates determination by the synchronizing signal generator 304. The synchronizing signal generator 304 determines that the video displayer 303 displays a left-eye frame which the viewer may view or appropriately view if a signal level of the L signal is high. Specifically, in the section (A) in FIG. 22, a synchronizing signal 2209 is transmitted from the synchronizing signal transmitter 306 at a change 2201 in signal level of the L signal from low to high. Likewise, in the section (A) in FIG. 22, a synchronizing signal 2210 to end the view of the left-eye frame is transmitted from the synchronizing signal transmitter 306 at a change 2202 in signal level of the L signal from high to low.

Like the left-eye frame, the example shown in the section (B) in FIG. 22 indicates the determination by the synchronizing signal generator 304. The synchronizing signal generator 304 determines that the video displayer 303 displays a right-eye frame which the viewer may view or appropriately view if a signal level of the R signal is high.

The synchronizing signal generator 304 may determine whether the left-eye and the right-eye frames are appropriately displayed. In this case, if there is an interval between the end timing 2205 of the right-eye frame and the start timing 2201 of the left-eye frame, the synchronizing signal transmitter may transmit the synchronizing signals in response to the end and start timings, respectively. Unlike the above description, there may be a shorter interval between the end timing of the right-eye frame and the start timing of the left-eye frame than the predetermined time interval. Control under such a condition is described in this embodiment.

The synchronizing signal generator 304 generates synchronizing signals in synchronism with left-eye and right-eye frames displayed on the video displayer 303 in accordance with characteristics of the video displayer 303. The transmission controller 306 basically transmits the synchronizing signals generated by the synchronizing signal generator 304 to an external device by means of any method. However, it takes a certain time for the synchronizing signal transmitter 306 to actually transmit a synchronizing signal although it depends on a transmission system, a transmission protocol and so on. In general, the time required for transmitting a synchronizing signal by the synchronizing signal transmitter 306 is longer than a time required for internally generating the synchronizing signal by the synchronizing signal generator 304. Accordingly, even if the synchronizing signal generator 304 generates several synchronizing signals in a short period, the synchronizing signal transmitter 306 may fail to transmit all the synchronizing signals within the period. The transmission control of the synchronization signals by the transmission controller 305 under such a condition is described in this embodiment.

Generation of the synchronizing signals by the synchronizing signal generator 304 under a time relationship between a signal level change timing 2207 shown in the section (B) in FIG. 22, and a signal level change timing 2203 shown in the section (A) in FIG. 22 is exemplified. The synchronizing signal generator 304 identifies the viewing end timing 2207 of a right-eye frame and the viewing start timing 2203 of a left-eye frame consecutively or within a very short period. In this case, the synchronizing signal transmitter 306 may fail to follow the operation of the synchronizing signal generator 304 for the aforementioned reason. If two consecutive synchronizing signals exist in a predetermined time, in other words, if a time interval between generations of preceding and succeeding synchronizing signals is no longer than a predetermined time, the transmission controller 305 controls the synchronizing signal transmitter 306 to inhibit transmitting the succeeding signal.

If the signal level change timings 2207, 2203 have the aforementioned relationship, the synchronizing signal generator 304 generates a synchronizing signal corresponding to a view end of a right-eye frame and a synchronizing signal corresponding to a view start for a left-eye frame. Meanwhile, the synchronizing signal transmitter 306 transmits a fourth and first synchronizing signals in this order, on the basis of the generated synchronizing signals. However, if the transmission controller 305 performs the aforementioned control, the transmission controller 305 controls the synchronizing signal transmitter 306 to transmit solely the fourth synchronizing signal, which is initially transmitted. Therefore, solely the fourth synchronizing signal is output from the video display apparatus 100.

Likewise, if the synchronizing signal generator 304 determines that there are the view end timing 2204 of the left-eye frame and the view start timing 2208 of the right-eye frame within a predetermined time, the transmission controller 305 controls the synchronizing signal transmitter 306 to transmit solely the third synchronizing signal 2212, and suspend transmission of the second synchronizing signal corresponding to the view start for the right-eye frame.

Therefore, if the synchronizing signal transmitter 306 fails to transmit a synchronizing signal to the external device at a time interval between synchronizing signals actually generated by the synchronizing signal generator 304, the transmission controller 305 prioritizes transmission of the preceding synchronizing signal, and suspends transmission of the succeeding synchronizing signal. As a result of the control operation, the synchronizing signal may not be transmitted from the video display apparatus 100 at an inappropriate timing.

It is preferable to appropriately operate video viewing glasses 120 under a condition that the video display apparatus 100 performs the aforementioned transmission of the synchronizing signals. Accordingly, it is preferable for a synchronizing signal analyzer 402 of the video viewing glasses 120 to store information about a receiving time interval of synchronizing signals in an ordinary case, and compare the kind and the reception time interval of the actually received synchronizing signals, with the stored kind and reception time interval of synchronizing signals to internally complement a synchronizing signal which has not been transmitted (received). For example, the complementation may be performed, as described in the context of FIG. 12, by storing the information about the kind and the reception time interval of the synchronizing signals in the synchronizing information storage 403 (memory 204), and generating an internal synchronizing signal in the video viewing glasses 120 by means of the internal synchronizing signal generator 404 and so on. Therefore, even if the video display apparatus 100 fails to transmit a synchronizing signal at an appropriate timing, in other words, several synchronizing signals have to be transmitted within a predetermined period, the synchronization between the video display apparatus 100 and the video viewing glasses 120 may be appropriately secured.

It is further preferable to implement an improved method for transmitting synchronizing signals under a condition in which the video display apparatus 100 performs synchronizing signal transmission and the video viewing glasses 120 perform a control in correspondence to the synchronizing signal transmission as described in this embodiment. For instance, the video display apparatus 100 transmits synchronizing signals with an identical time interval at least a predetermined number of times (e.g. N times). Specifically, if a cycle constituted of a view start of a left-eye frame, a view end for the left-eye frame, a view start for a right-eye frame and a view end for the right-eye frame is defined as one set, the video display apparatus 100 transmits synchronizing signals with an identical time interval (transmission cycle) for at least N times. In this case, even if there is a synchronizing signal that has not been transmitted, as described in this embodiment, the video display apparatus 100 repeatedly transmits synchronizing signals in the same condition (condition in which there is a synchronizing signal that is not transmitted) at least N times. Therefore, the video viewing glasses 120 may very accurately generate an internal synchronizing signal. The video viewing glasses 120 change the control of the optical filter section by successively receiving the same information about the kind and the receiving time interval of the synchronizing signals a predetermined times. The predetermined times in this case is preferably no more than N times, if the video display apparatus 100 transmits information under the same condition N times.

The contents recited in the first to fourth embodiments are not limited to the aforementioned embodiments. For instance, a process executed by hardware may be executed by means of software, which is executed on a CPU. Contrarily, a process of software executed by a CPU may be executed by means of hardware.

The aforementioned embodiments mainly include features described in the following descriptions.

A video display apparatus for displaying a video to be viewed through video viewing glasses according to one aspect of the aforementioned embodiment includes: a display section configured to display the video; a synchronizing signal generator configured to generate an external synchronizing signal in synchronism with the video to notify the video viewing glasses of a display end of a frame constituting the video; and a synchronizing signal transmitter configured to transmit the external synchronizing signal.

According to the aforementioned configuration, the video display apparatus may transmit the signal to notify the display end of the frame constituting the video.

In the aforementioned configuration, the external synchronizing signal is used for control to close an optical filter section of the video viewing glasses. Therefore, the optical filter section of the video viewing glasses may be closed in correspondence to the display end of the frame.

In the aforementioned configuration, the synchronizing signal generator generates the external synchronizing signal based on display characteristics of the display section. Therefore, the video display apparatus may transmit the signal to notify the display end of the frame constituting the video on the basis of the display characteristics of the display section.

In the aforementioned configuration, the display characteristics of the display section are afterglow characteristics. Therefore the video display apparatus may transmit the signal to notify the display end of the frame constituting the video on the basis of the afterglow characteristics.

In the aforementioned configuration, the display section is a plasma display panel. Therefore the video display apparatus may transmit the display end of the frame constituting the video on the basis of the afterglow characteristics of the plasma display panel.

In the aforementioned configuration, the video display apparatus may further include a transmission controller, wherein the transmission controller controls the synchronizing signal transmitter to transmit synchronizing signal groups comprising a plurality of the external synchronizing signals included in a predetermined time, respectively. In this configuration, the synchronizing signal transmitter transmits one of the synchronizing signal groups under control of the transmission controller, a predetermined time after another of the synchronizing signal groups is transmitted under the control of the transmission controller. In this configuration, a remote controlling device configured to transmit data to the display apparatus so that the video display apparatus performs a predetermined operation, wherein the predetermined time is more than twice as long as a time required for the remote controlling device to transmit the data. Thus, it becomes less likely that there is interference between the signal from the remote controlling device and the synchronizing signal transmitted from the video display apparatus.

In the aforementioned configuration, the video includes a first video and a second video, the display section alternately displays the first and second videos with time, the synchronizing signal generator generates two kinds of the external synchronizing signals for notifying a display start of a frame constituting the first video, a display end of the frame constituting the first video, a display start of a frame constituting the second video, and a display end of the frame constituting the second video, and the two kinds of the external synchronizing signals are different in waveform from each other. In this configuration, the two kinds of the external synchronizing signals include a first synchronizing signal for notifying the display start and the display end of the frame constituting the first video, and a second synchronizing signal for notifying the display start and the display end of the frame constituting the second video. Thus, the video display apparatus may use and transmit the two kinds of the external synchronizing signals different in waveform each other to notify the display start and the display end of the frame.

In the aforementioned configuration, the synchronizing signal transmitter transmits the first synchronizing signal, the first synchronizing signal, the second synchronizing signal and the second synchronizing signal in this order if the first and second videos are different in contents from each other.

In the aforementioned configuration, the video includes a first video and a second video, the display section alternately displays the first and second videos with time, the synchronizing signal generator generates three kinds of the external synchronizing signals for notifying a display start of a frame constituting the first video, a display end of the frame constituting the first video, a display start of a frame constituting the second video, and a display end of the frame constituting the second video, and the three kinds of the external synchronizing signals are different in waveform from each other. In this configuration, the three kinds of the external synchronizing signals include a first synchronizing signal for notifying the display start of the frame constituting the first video, a second synchronizing signal for notifying the display start of the frame constituting the second video, and a third synchronizing signal for notifying the display ends of the frames constituting the first and second videos, respectively. Thus, the video display apparatus may use and transmit solely the three kinds of the external synchronizing signals different in waveform from each other to notify the display start and display end of the frame.

In the aforementioned configuration, the synchronizing signal transmitter transmits the first synchronizing signal, the third synchronizing signal, the second synchronizing signal and the third synchronizing signal in this order if the first and second videos are different in contents from each other. In this configuration, the synchronizing signal transmitter transmits solely one of the first, second and third synchronizing signals if the contents of the first and second videos are identical to each other or if the video displayed on the display section is constituted solely of the first video. Thus, the video display apparatus may transmit the signals to notify a period during which the video display apparatus displays a quality video.

In the aforementioned configuration, the video includes a first video and a second video, the display section alternately displays the first and second videos with time, the synchronizing signal generator generates four kinds of the external synchronizing signals for notifying a display start of a frame constituting the first video, a display end of the frame constituting the first video, a display start of a frame constituting the second video, and a display end of the frame constituting the second video, and the four kinds of the external synchronizing signals are different in waveform from each other. In this configuration, the four kinds of the external synchronizing signals include a first synchronizing signal for notifying the display start of the frame constituting the first video, a second synchronizing signal for notifying the display start of the frame constituting the second video, a third synchronizing signal for notifying the display end of the frame constituting the first video, and a fourth synchronizing signal for notifying the display end of the frame constituting the second video. Thereby, the video display apparatus may use and transmits solely the four kinds of the external synchronizing signals different in waveform from each other to notify the display start and the display end of the frame.

In the aforementioned configuration, the synchronizing signal transmitter transmits the first synchronizing signal, the third synchronizing signal, the second synchronizing signal and the fourth synchronizing signal in this order if the first and second videos are different in contents from each other. In this configuration, the synchronizing signal transmitter transmits solely one of the first, second, third and fourth synchronizing signals if contents of the first and second videos are identical to each other or if the video displayed on the display section is constituted solely of the first video. Thus, the video display apparatus may transmit the signals to notify a period during which the video display apparatus displays a quality video.

Video viewing glasses according to another aspect of the above embodiment include: a synchronizing signal receiver configured to receive an external synchronizing signal in synchronism with a video, the external synchronizing signal notifying a display end of a frame constituting a video; an optical filter section including a pair of optical filters configured to adjust light amounts to be transmitted to a left eye and a right eye of a viewer, respectively; and an optical filter controller configured to control the optical filter section in response to the external synchronizing signal.

According to the aforementioned configuration, the viewer may be provided with a quality video.

In the aforementioned configuration, the optical filter controller controls the optical filter section in response to the external synchronizing signal to close one of the optical filters so that both of the optical filters are closed for a predetermined period until another of the optical filters is opened. Therefore, the viewer may be provided with a quality video.

In the aforementioned configuration, the video viewing glasses may further include an internal synchronizing signal generator configured to generate an internal synchronizing signal in response to the external synchronizing signal, wherein the optical filter controller controls the optical filter section by means of the internal synchronizing signal in response to the external synchronizing signal. Thereby, the optical filter section may be continued to control even without reception of the external synchronizing signal.

In the aforementioned configuration, the optical filter controller controls the optical filter section to close both of the optical filters for the predetermined period in response to the internal synchronizing signal. Therefore, the video viewing glasses may continue to create a period for the light amount to decrease even without reception of the external synchronizing signal.

In the aforementioned configuration, the optical filter controller controls the optical filter section based on the internal synchronizing signal and characteristics of the optical filters. Therefore, the viewer may be provided with a clear video independently of performances of the optical filter.

In the aforementioned configuration, the external synchronizing signal includes a first external synchronizing signal and a second external synchronizing signal, which are different in waveform from each other. In this configuration, if the optical filter controller controls the optical filter section to open the one of the optical filters in response to the first external synchronizing signal and then the external synchronizing signal receiver receives the first external synchronizing signal, the optical filter controller controls the optical filter section to close the one of the optical filters, and if the optical filter controller controls the optical filter section to open the other of the optical filters in response to the second external synchronizing signal and then the external synchronizing signal receiver receives the second external synchronizing signal, the optical filter controller controls the optical filter section to close the other of the optical filters. Thus, the optical filter section may be controlled by means of solely the two kinds of the synchronizing signals which are different in waveform from each other.

In the aforementioned configuration, the external synchronizing signal includes a first external synchronizing signal, a second external synchronizing signal and a third synchronizing signal which are different in waveform from each other. In this configuration, the optical filter controller controls the optical filter section to open the one of the optical filters in response to the first external synchronizing signal, the optical filter controller controls the optical filter section to open the other of the optical filters in response to the second external synchronizing signal, and the optical filter controller controls the optical filter section to close both of the optical filters in response to the third external synchronizing signal. In this configuration, the external synchronizing signal receiver receives the external synchronizing signal in order of the first external synchronizing signal, the third external synchronizing signal, the second external synchronizing signal and the third external synchronizing signal. Thus, the optical filter section may be controlled by means of solely the three kinds of the synchronizing signals which are different in waveform from each other.

In the aforementioned configuration, the external synchronizing signal includes a first external synchronizing signal, a second external synchronizing signal, a third synchronizing signal and a fourth external synchronizing signal which are different in waveform from each other. In this configuration, the optical filter controller controls the optical filter section to open the one of the optical filters in response to the first external synchronizing signal, the optical filter controller controls the optical filter section to open the other of the optical filters in response to the second external synchronizing signal, the optical filter controller controls the optical filter section to close the one of the optical filters in response to the third external synchronizing signal, and the optical filter controller controls the optical filter section to close the other of the optical filters in response to the fourth external synchronizing signal. In this configuration, the external synchronizing signal receiver receives the external synchronizing signal in order of the first external synchronizing signal, the third external synchronizing signal, the second external synchronizing signal and the fourth external synchronizing signal.

In the aforementioned configuration, the external synchronizing signal includes a plurality of the external synchronizing signals which are different in waveform from each other, and the internal synchronizing signal generator generates the internal synchronizing signal, based on a receiving time interval among the plurality of the external synchronizing signals. Thereby, the optical filter section may be continued to control even without reception of the external synchronizing signal.

A video system according to yet another aspect of the above embodiment is provided with a video display apparatus and video viewing glasses used for viewing a video displayed on the video display apparatus. The video display apparatus includes: a display section configured to display a video; a synchronizing signal generator configured to generate an external synchronizing signal in synchronism with the video to notify a display end of a frame constituting the video; and a synchronizing signal transmitter configured to transmit the external synchronizing signal to the video viewing glasses. The video viewing glasses include: a synchronizing signal receiver configured to receive the external synchronizing signal; an optical filter section having a pair of optical filters configured to adjust light amounts to be transmitted to a left eye and a right eye of a viewer, respectively; and an optical filter controller configured to control the optical filter section in response to the external synchronizing signal.

It becomes likely that the aforementioned configuration prevents the viewer from viewing a video during a switching operation between frames and provides the viewer with a quality video.

What is claimed is:

1. Video viewing glasses comprising:
   a couple of optical filters which allow light to transmit toward left and right eyes, respectively,
   a synchronizing signal receiver configured to receive four kinds of external synchronization signals, which include a first synchronization signal to open the optical filter for the left eye, a second synchronization signal to close the optical filter for the left eye, a third synchronization signal to open the optical filter for the right eye and a fourth synchronization signal to close the optical filter for the right eye; and
   an optical filter controller which generates internal synchronization signals in the video viewing glasses after the synchronizing signal receiver receives the four kinds of the external synchronization signals, the optical filter controller then operating the optical filters by means of the internal synchronization signals,
   wherein the optical filters have response characteristics defined so that it takes a first time length after the synchronizing signal receiver receives the four kinds of the external synchronization signals and a second time length after the optical filter controller generates the internal synchronization signals for an opening rate of the optical filters to be a predetermined value, and
   wherein the optical filter controller delays timings of generating the internal synchronization signals from a reception time of each of the four kinds of the external synchronization signals by a time length in correspondence to a difference between the first and second time lengths.

2. A method for controlling the video viewing glasses described in claim 1, the method comprising steps of:
   receiving the external synchronization signal by means of the synchronizing signal receiver; and
   generating the internal synchronization signals in the video viewing glasses a predetermined delay time after each of reception times of the four kinds of the external synchronization signals, the predetermined delay time corresponding to the difference between the first and second time lengths.

* * * * *